Figure 1:
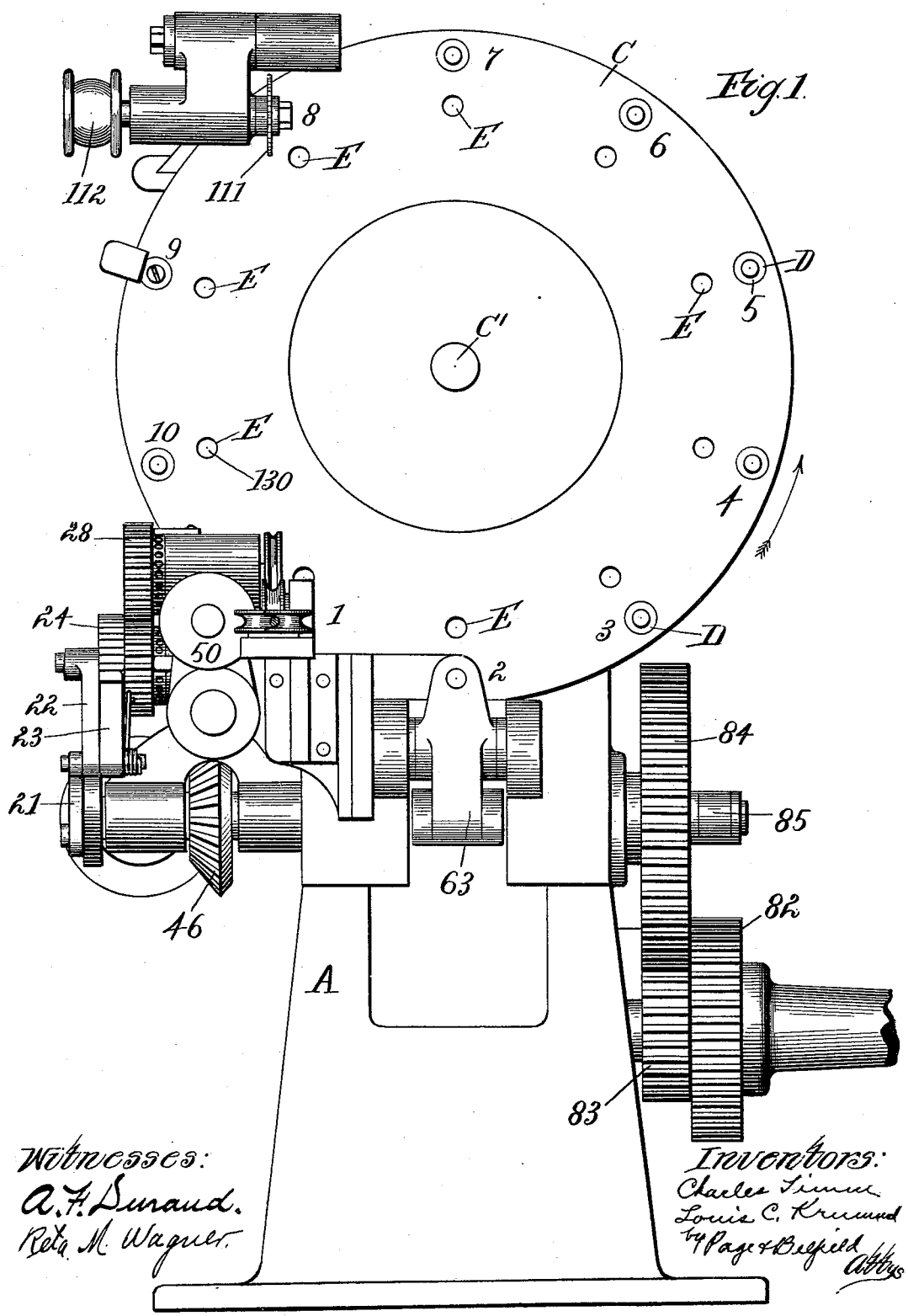

(No Model.) 13 Sheets—Sheet 1.

C. TIMM & L. C. KRUMMEL.
MACHINE FOR MAKING CONSTRUCTIVE PARTS.

No. 582,887. Patented May 18, 1897.

Witnesses:
A. F. Durand.
Reta M. Wagner.

Inventors:
Charles Timm
Louis C. Krummel
by Page & Biefield
Attys (No Model.) 13 Sheets—Sheet 3.

C. TIMM & L. C. KRUMMEL.
MACHINE FOR MAKING CONSTRUCTIVE PARTS.

No. 582,887. Patented May 18, 1897.

(No Model.) 13 Sheets—Sheet 5.

C. TIMM & L. C. KRUMMEL.
MACHINE FOR MAKING CONSTRUCTIVE PARTS.

No. 582,887. Patented May 18, 1897.

Witnesses:
A. F. Durand.
Rita M. Wagner.

Inventors:
Charles Timm
Louis C. Krummel
by Page & Belfield Attys (No Model.) 13 Sheets—Sheet 6.
C. TIMM & L. C. KRUMMEL.
MACHINE FOR MAKING CONSTRUCTIVE PARTS.
No. 582,887. Patented May 18, 1897.
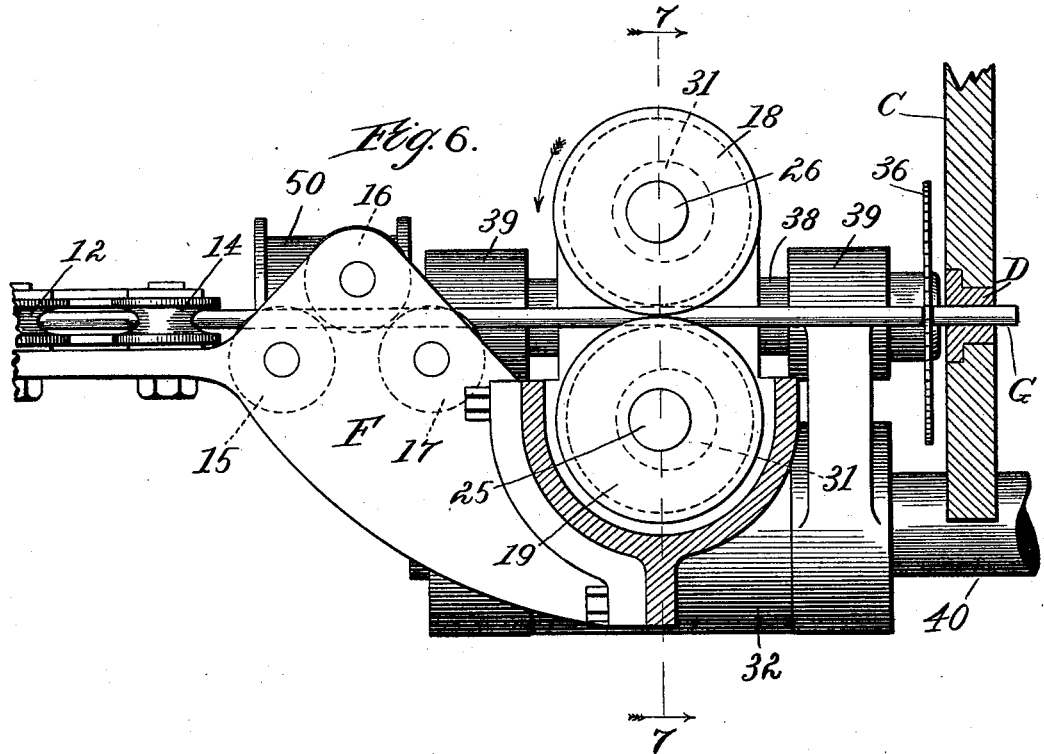
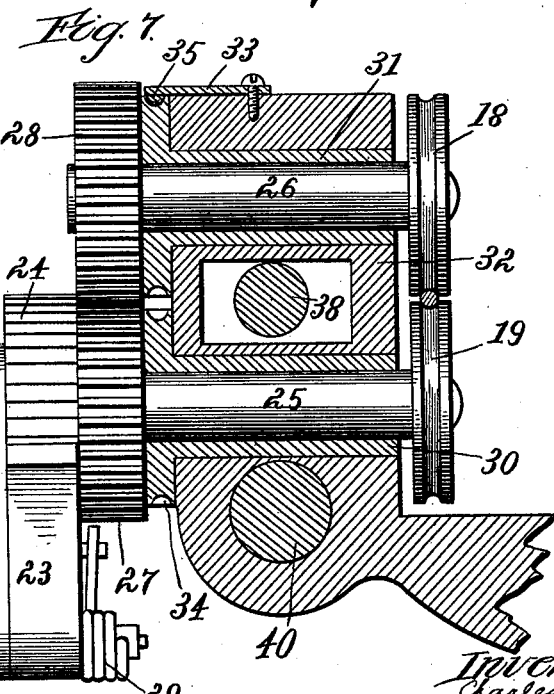

(No Model.) 13 Sheets—Sheet 7.
C. TIMM & L. C. KRUMMEL.
MACHINE FOR MAKING CONSTRUCTIVE PARTS.
No. 582,887. Patented May 18, 1897.
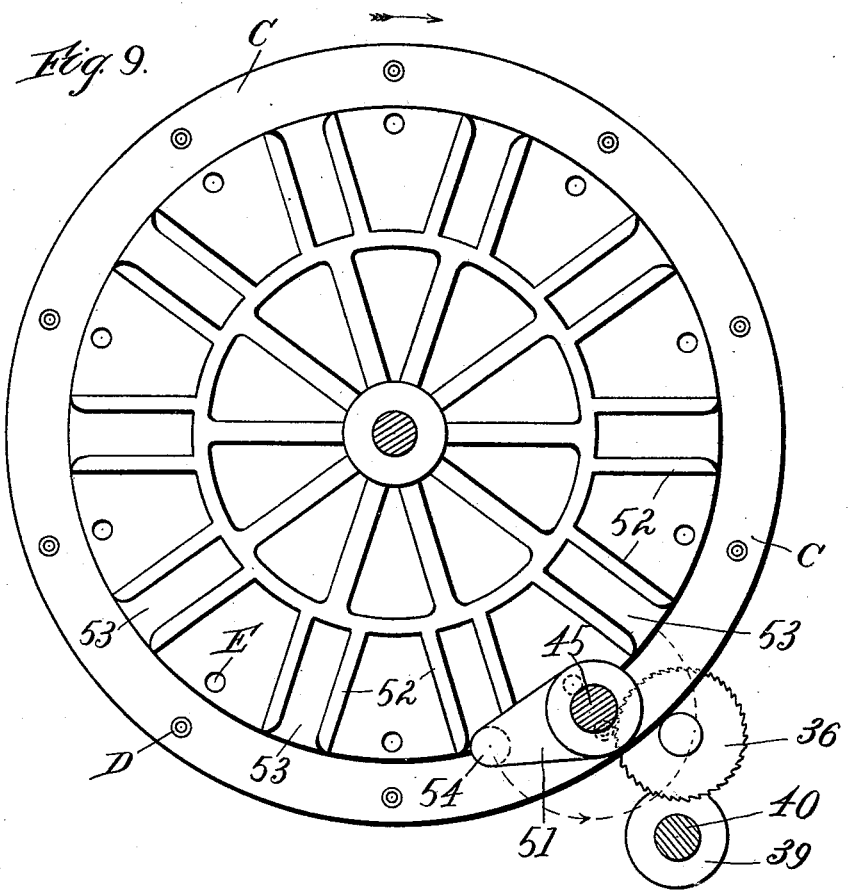
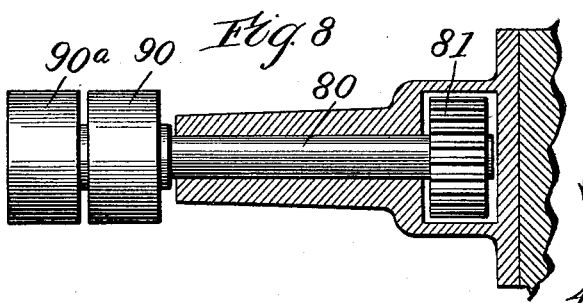
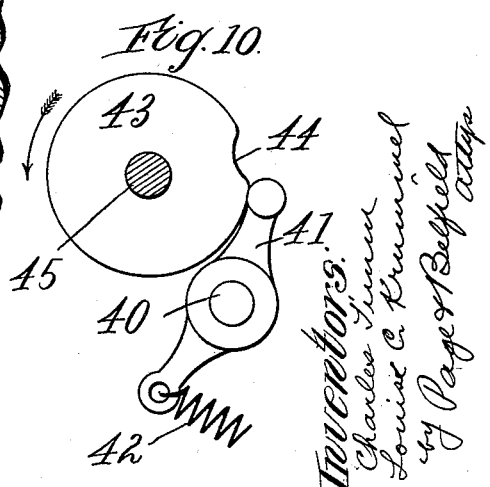

(No Model.) 13 Sheets—Sheet 8.
C. TIMM & L. C. KRUMMEL.
MACHINE FOR MAKING CONSTRUCTIVE PARTS.
No. 582,887. Patented May 18, 1897.
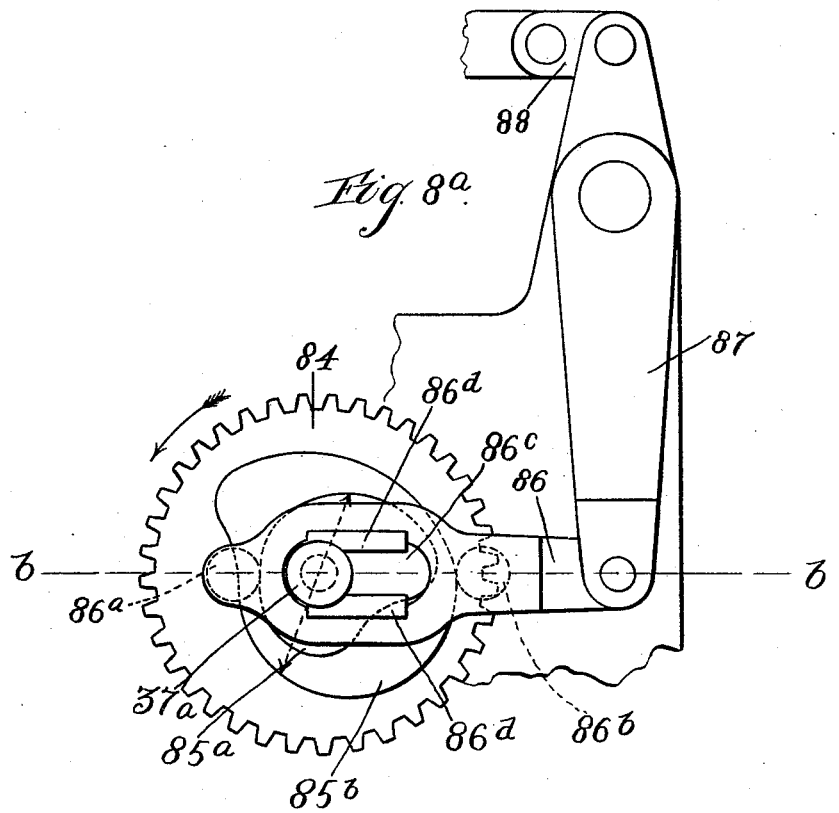
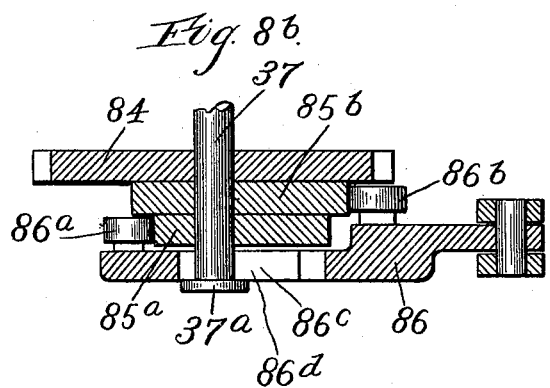
Witnesses:
A. H. Durand.
Bela M. Wagner.
Inventors:
Charles Timm
Louis C. Krummel
by Page & Belfield
attys.
THE NORRIS PETERS CO., PHOTO-LITHO., WASHINGTON, D. C.

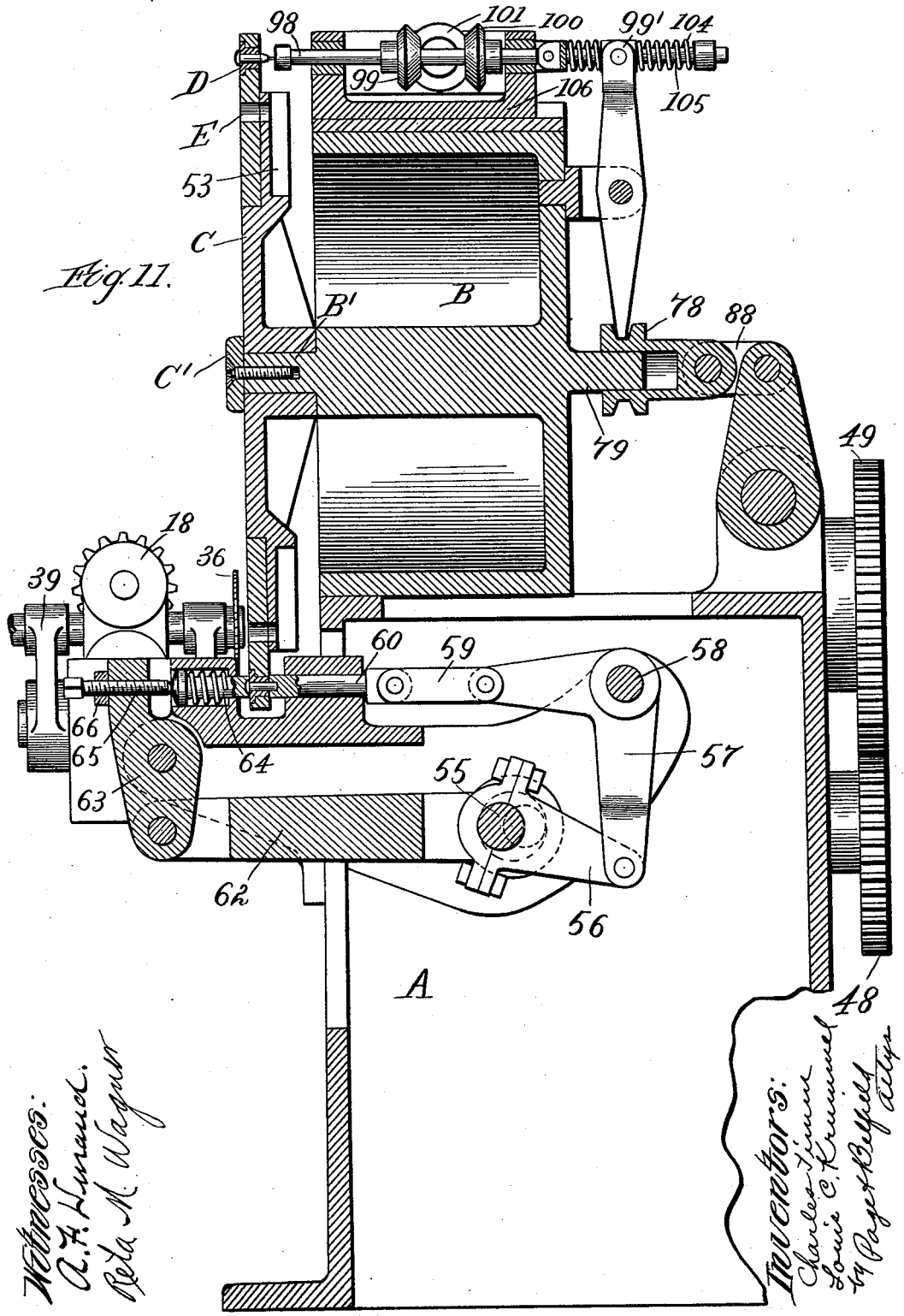

(No Model.) 13 Sheets—Sheet 10.
C. TIMM & L. C. KRUMMEL.
MACHINE FOR MAKING CONSTRUCTIVE PARTS.
No. 582,887. Patented May 18, 1897.

Witnesses:
A. F. Durand.
Peta M. Wagner.

Inventors:
Charles Timm
Louis C. Krummel
by Paget Belfield
Attys.

THE NORRIS PETERS CO., PHOTO-LITHO., WASHINGTON, D. C.

(No Model.) 13 Sheets—Sheet 11.
C. TIMM & L. C. KRUMMEL.
MACHINE FOR MAKING CONSTRUCTIVE PARTS.
No. 582,887. Patented May 18, 1897.
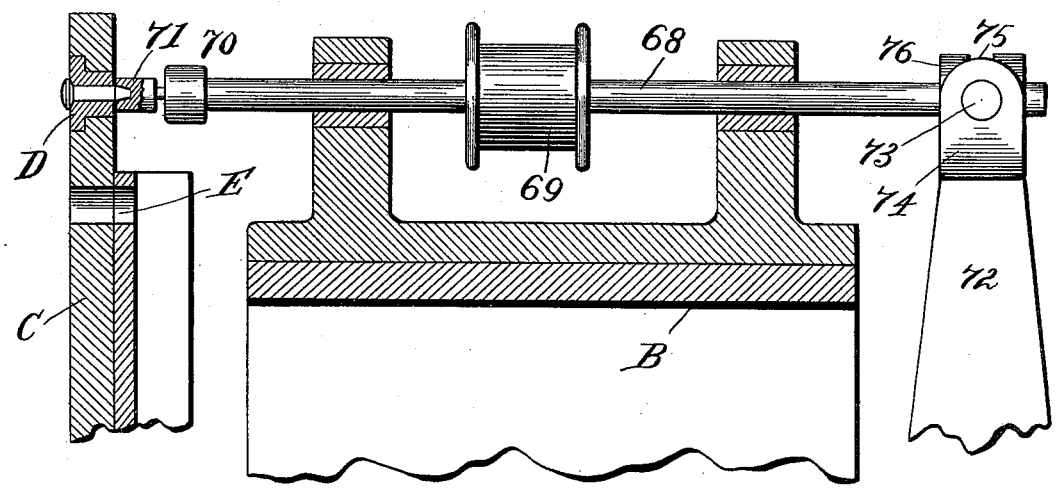
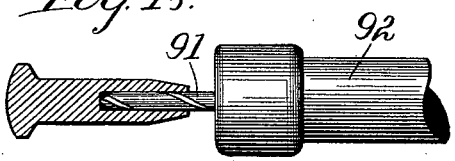
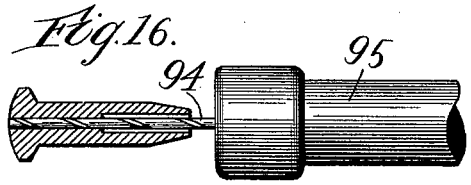
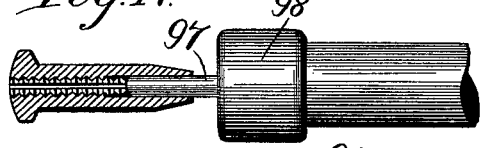
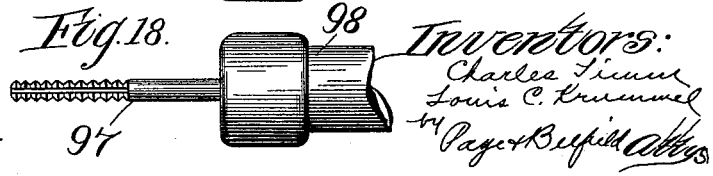
Witnesses:
A. F. Durand.
Reta M. Wagner.
Inventors:
Charles Timm
Louis C. Krummel
by Page & Burfield attys (No Model.) 13 Sheets—Sheet 12.
C. TIMM & L. C. KRUMMEL.
MACHINE FOR MAKING CONSTRUCTIVE PARTS.
No. 582,887. Patented May 18, 1897.
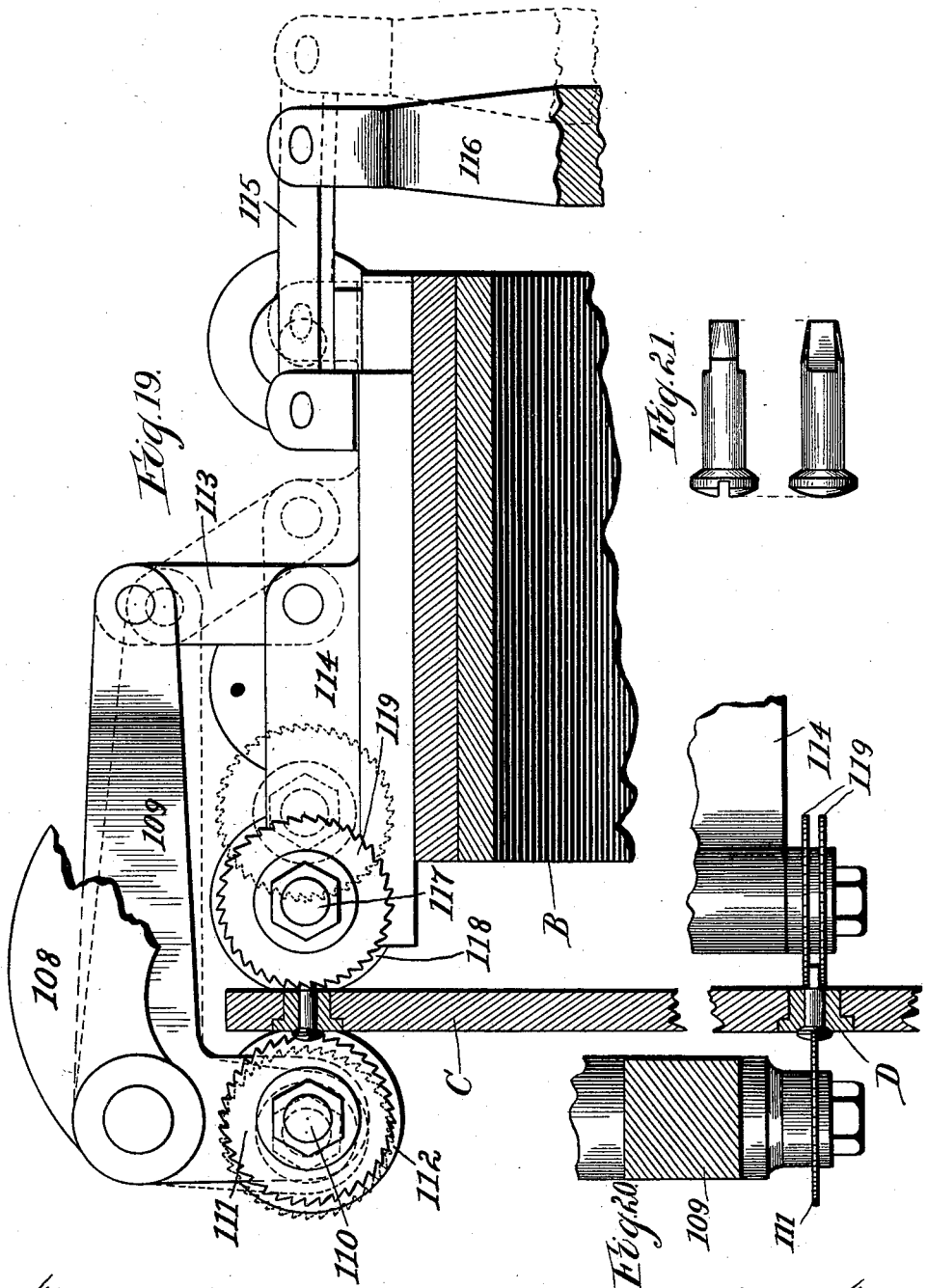
Witnesses:
A. F. Durand.
Reta M. Wagner.
Inventors:
Charles Timm
Louis C. Krummel
by Page & Balfield Attys (No Model.) 13 Sheets—Sheet 13.

C. TIMM & L. C. KRUMMEL.
MACHINE FOR MAKING CONSTRUCTIVE PARTS.

No. 582,887. Patented May 18, 1897.

Witnesses:
A. F. Durand.
Reta M. Wagner.

Inventors:
Charles Timm
Louis C. Krummel
by Page & Belfield Attys

THE NORRIS PETERS CO., PHOTO-LITHO., WASHINGTON, D. C.

UNITED STATES PATENT OFFICE.

CHARLES TIMM, OF KENOSHA, WISCONSIN, AND LOUIS C. KRUMMEL, OF CHICAGO, ILLINOIS, ASSIGNORS TO THE STERLING CYCLE WORKS, OF CHICAGO, ILLINOIS.

MACHINE FOR MAKING CONSTRUCTIVE PARTS.

SPECIFICATION forming part of Letters Patent No. 582,887, dated May 18, 1897.

Application filed March 10, 1896. Serial No. 582,586. (No model.)

*To all whom it may concern:*

Be it known that we, CHARLES TIMM, residing in the city of Kenosha, county of Kenosha, State of Wisconsin, and LOUIS C. KRUMMEL, residing in the city of Chicago, county of Cook, and State of Illinois, citizens of the United States, have invented certain new and useful Improvements in Machines for Making Constructive Parts, of which the following is a specification.

In the construction or manufacture of various machines, devices, and apparatus it is necessary to use a number of parts or pieces, usually rather small in size, which require one or more operations to be performed on them to give the particular shape, form, or characteristic desired. For instance, such parts as screws, bolts, nipples, caps, nuts, and the like require threading, drilling, slotting, or treatment in some other way well known to skilled machinists to change the original castings or blanks to the form or shape they are to have in order to be available for use. To machinery for thus making or forming such parts or pieces our invention relates particularly. It will be readily seen, however, that the principles of operation and construction which it embodies need not be limited to any particular class or size of work, but are applicable to many varieties, irrespective of the material of which it is composed, the shape or form in which it comes to the machine, or the number or kind of the operations which are to be performed on it.

Prominent objects of our invention are to produce a machine which is capable of automatically performing the various operations incident to the formation of any particular part or piece—that is to say, a machine which is capable of receiving stock in a certain condition, of performing on such stock a number of operations of a predetermined character, and of discharging the finished product when the last operation has been completed without requiring manual assistance from the time the stock enters the machine till the product emerges therefrom—and to make such a machine capable of efficiently and economically making such parts with great rapidity, so that large numbers of them may be turned out in a comparatively short space of time.

A further object of our invention is to provide a machine of this kind which is particularly adapted for making nipples, caps, or attachments for securing the spokes of bicycle or similar wheels to their rims.

To such end our invention consists in the general arrangement and mode of operation of such a machine, as is hereinafter described, and also in the particular construction which adapts it for the formation of nipples or caps for bicycle-spokes from prepared stock in the form of wire.

Hence the description of our invention will be confined to its adaptation to a machine for making nipples, although, as already stated, it is not intended by so doing to limit its scope to this particular class of articles.

It will be borne in mind that a nipple of the kind commonly used in the construction of metal-rimmed wheels is provided with an enlarged portion or head at one end to prevent its being drawn entirely through the rim and a threaded socket in which the spoke may be inserted and held. The head is slotted, so that the nipple may be readily turned by a screw-driver when assembling the various parts of the wheels, and the nipple itself is provided with flat surfaces, forming substantially a bolt, which may be grasped by a wrench so as to turn the nipple and thereby tighten the spoke in case it is inconvenient to turn the same by a screwdriver—as, for instance, when a tire has been placed on the rim so as to cover the head of the nipple. Ordinarily the socket of the nipple extends through its entire length, but only a portion thereof is threaded—namely, that portion which is at the headed end. The remaining portion is drilled slightly greater in diameter, so that the end of the spoke may pass through it freely to engage with the threaded portion. The end of the nipple overlapping the spoke is also beveled, rounded, or tapered, so as to avoid rough cutting corners. To construct a nipple with these characteristics, our invention contemplates assembling in a serial order various mechanisms for performing the necessary operations, in providing means for feeding stock-wire to the machine and for cutting it off, so as to leave in the machine a portion of the stock-wire or a blank containing sufficient material for a nipple, and in providing means for carrying this blank to the various mechanisms and leaving it in positions to be successively operated on by them until transformed to a finished nipple. When thus completed, the nipple is automatically discharged or extracted from the carrying device and stock for a new blank inserted.

As a preferred construction the operating mechanisms are mounted on or about a frame or support forming a tool-holder. These consist, in the order in which the blank is brought to them, in mechanisms, first, for upsetting an end of the stock to form the head; second, for coning or tapering the opposite end of the nipple; third, for drilling the entering socket; fourth, for drilling a concentric smaller socket which is to be threaded; fifth, for threading this smaller socket; sixth, for slotting the head to accommodate a screwdriver and for flattening at the same time a portion of the length of the nipple, so as to produce faces which may be grasped by a wrench, which operation we shall term "slabbing," and, seventh, for extracting the completed nipple from the carrying device. In order to transport the blank from one of these mechanisms to another, a carrier, consisting preferably in a plate or disk, is mounted near said tool-holder and provided with apertures wherein the stock-wire forming the blanks may be fed and held during the performance of said operations. This carrying-plate is also so arranged that it is turned a portion of a revolution after stock has been fed in and cut off to carry the blank to the first operating tool or mechanism, where it is left until such operation has been performed. Then it is turned so as to bring the blank to the next tool, where the second operation is performed, and so on until all the operations have been performed and the nipple extracted from the aperture containing it. It will be understood that for economical purposes said carrying plate or disk is provided with the same number of apertures as there are operations to be performed, that such apertures and mechanisms are arranged at equal distances apart on the circumference of a circle, that wire is fed into an aperture and cut off, so as to leave a blank in the disk at every stop, so that the disk after one revolution contains in its apertures nipples in all stages of completion, and that while each individual nipple is operated on serially all the nipples in the disk, by being left opposite the various mechanisms at the same time, are in position to be operated on simultaneously. Hence as a matter of further improvement the various operating-tools are arranged so that they perform their respective operations synchronously. As a preferred means of accomplishing this the operating mechanisms are slidingly mounted about the tool-holder, which is desirably in the form of a drum, and simultaneously moved toward the blanks left opposite them rather than have the carrier with its blanks moved toward said mechanisms, which obviously would accomplish the same result. It is understood that certain of these tools, such as drills, taps, and the like, are continually rotating, so that it is only necessary to bring them into contact with the blanks to secure the performance of their respective operations.

As a simple means of removing the completed nipples from the carrier we provide a punch or pin which is arranged to enter the aperture containing such a nipple and drive the latter therefrom. We also desirably provide means for temporarily locking the carrier at a time when it is at rest and the mechanisms are operating on its contained blanks. This locking device desirably takes effect just before the mechanisms operate and does not release the carrier until after the tools have ceased operating. By this arrangement the accurate adjustment of the blanks to the mechanisms and their retention in such adjustment are insured.

Further novel features of our invention are hereinafter pointed out.

Figure 2:
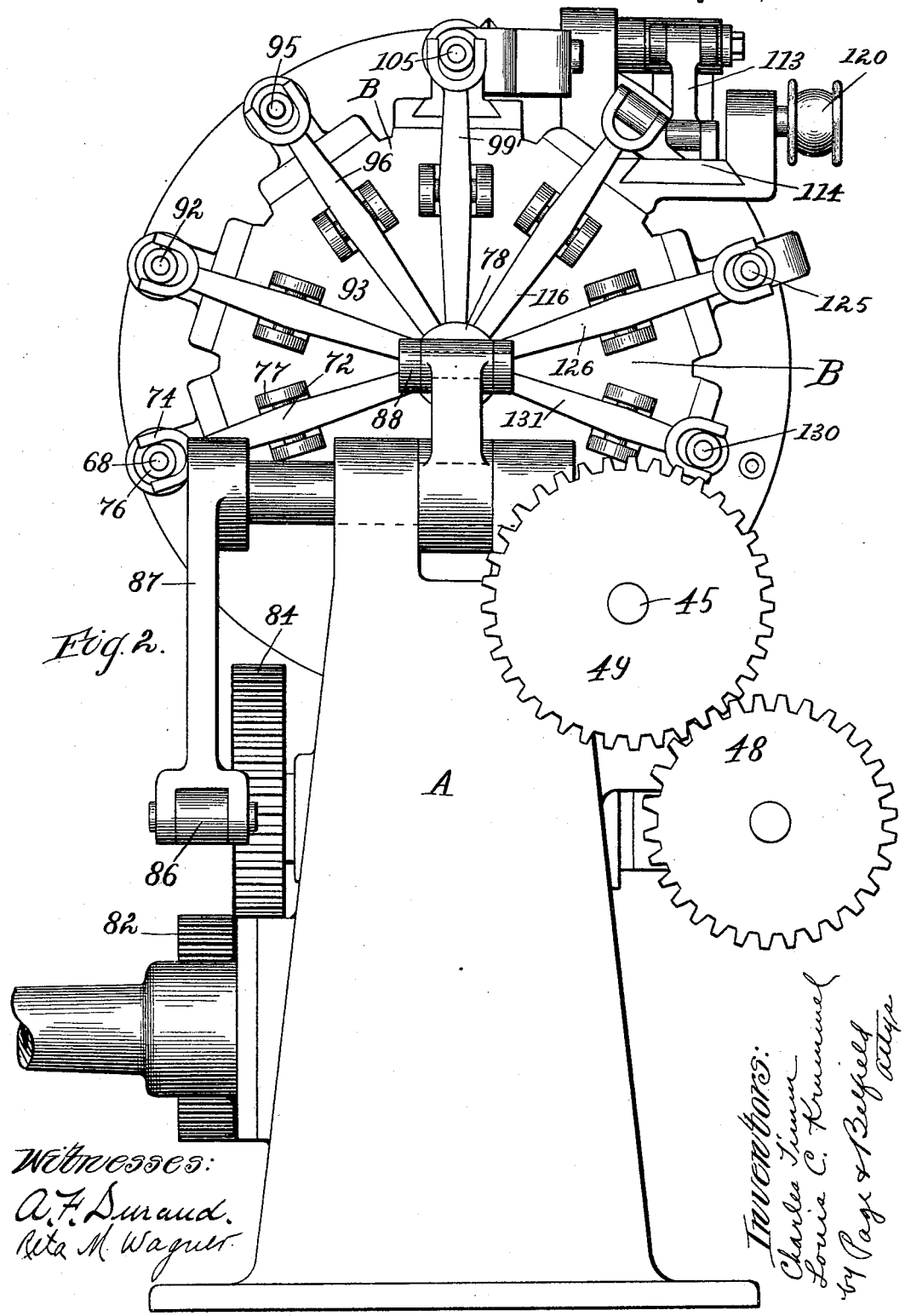
Figure 3:
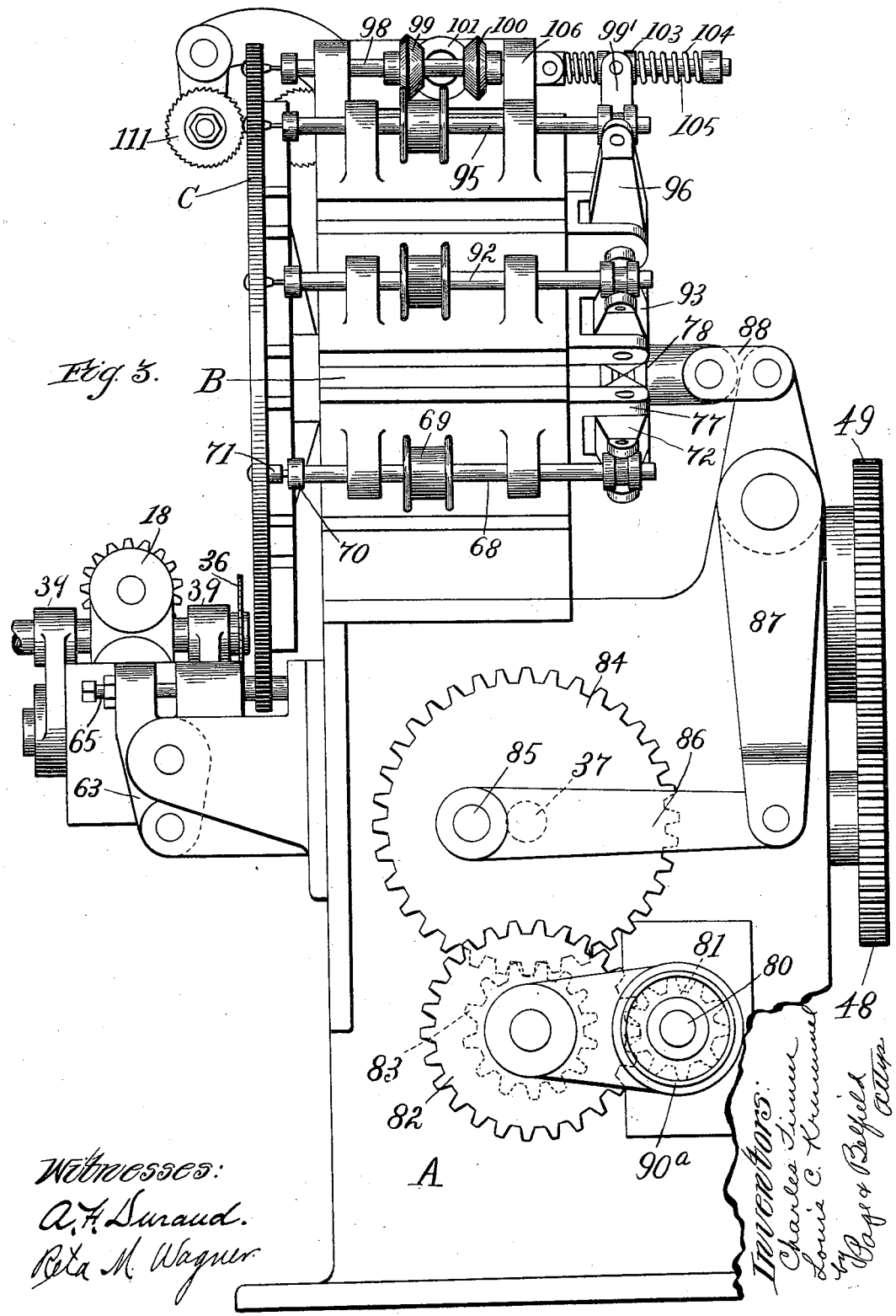
Figure 4:
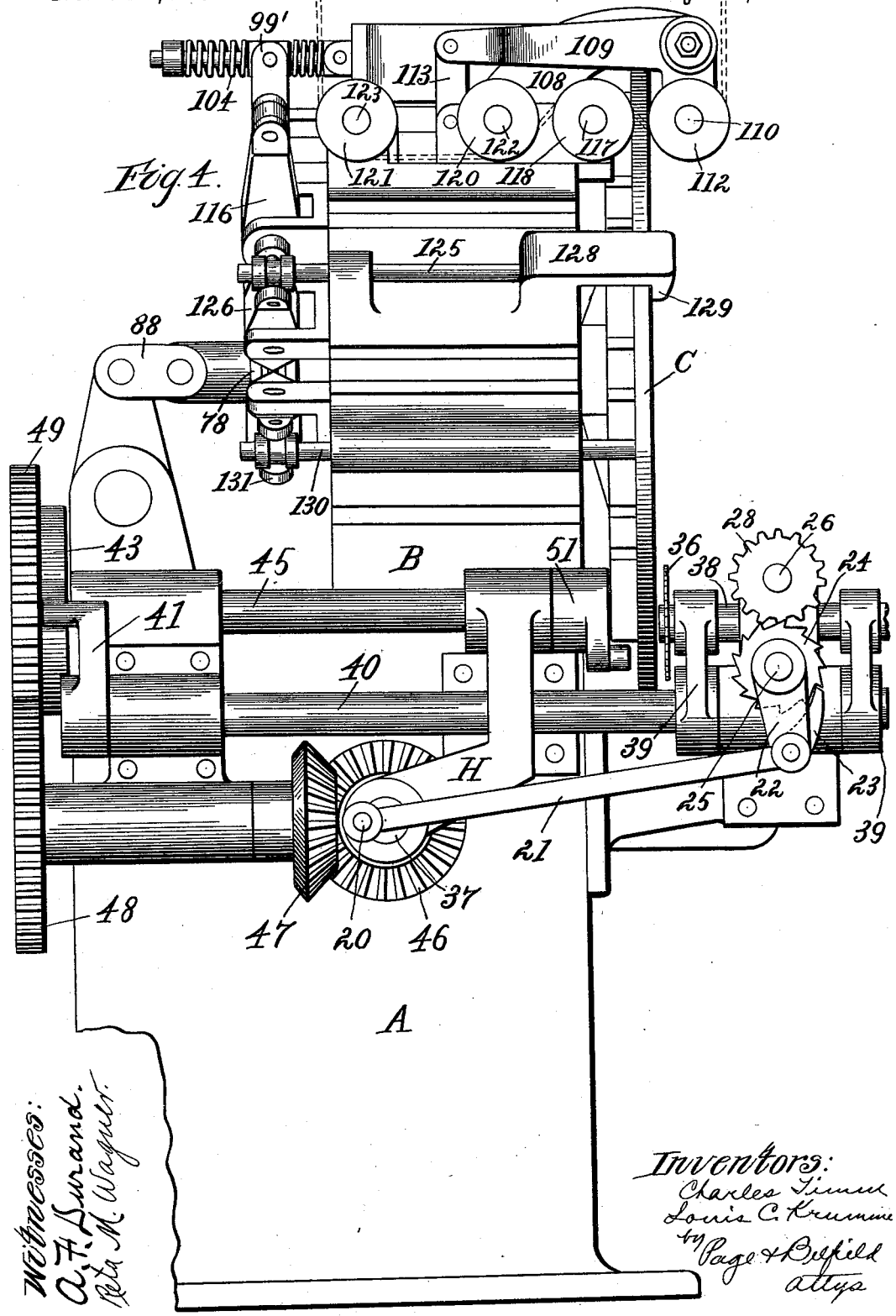
Figure 5:
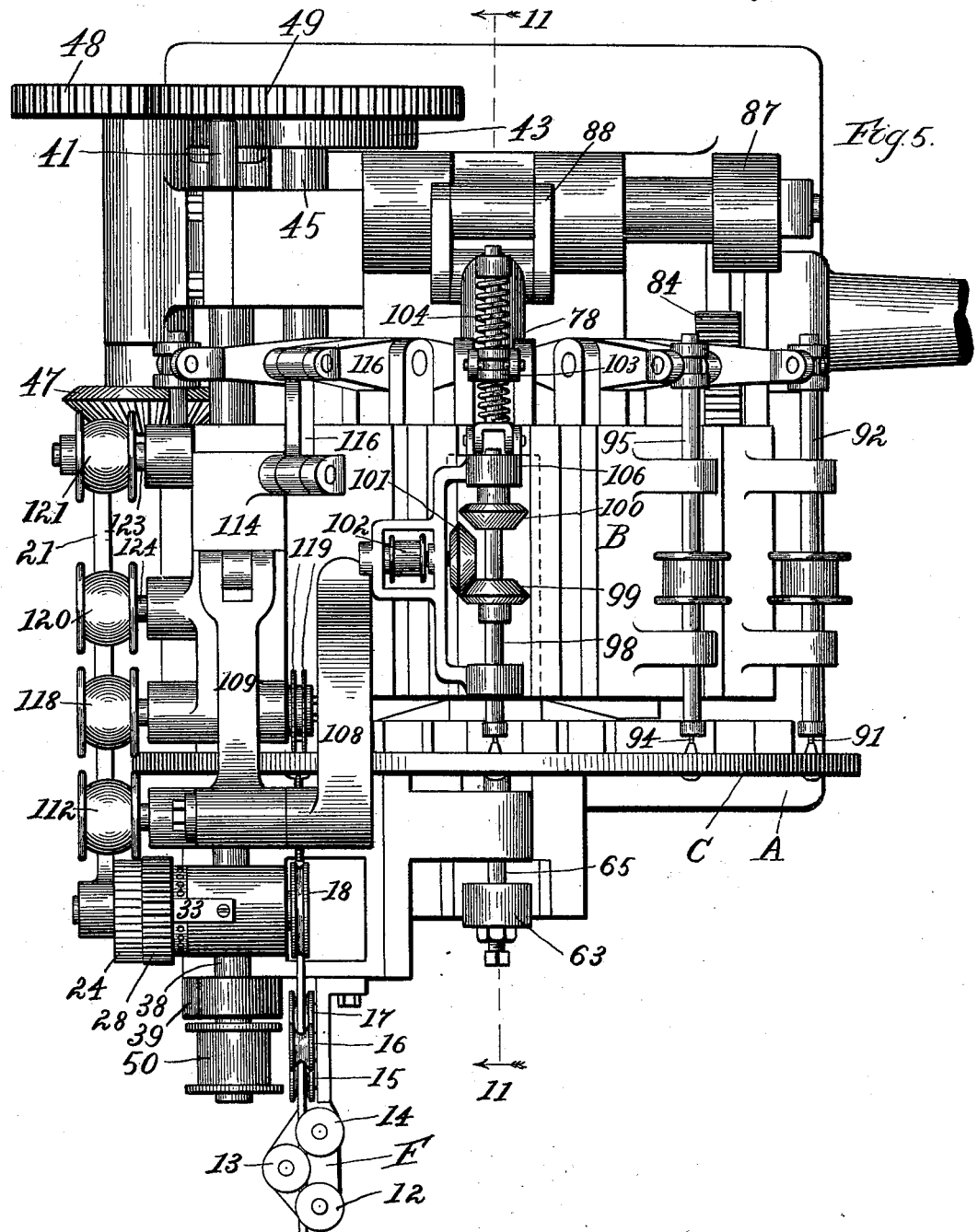
Figure 12:
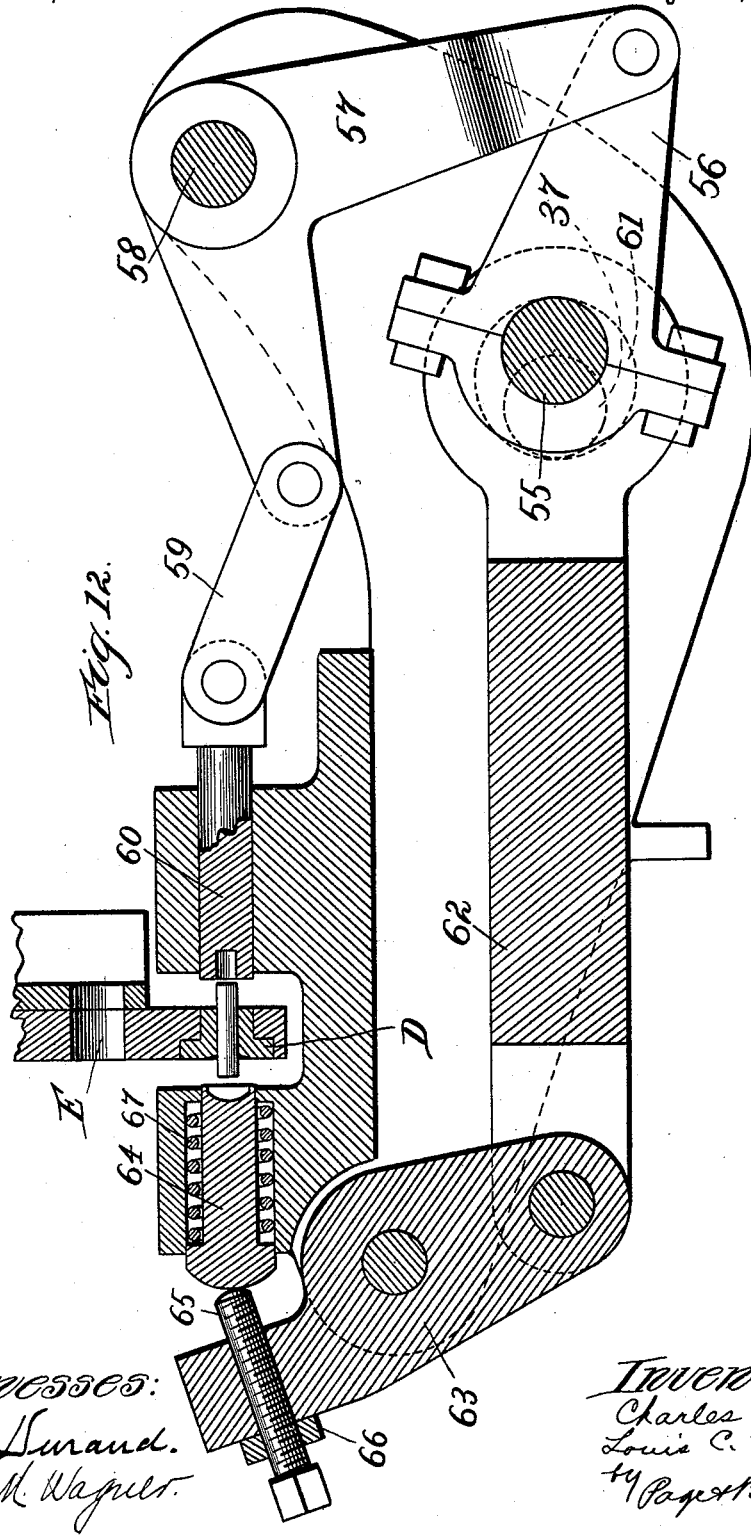
Figure 22:
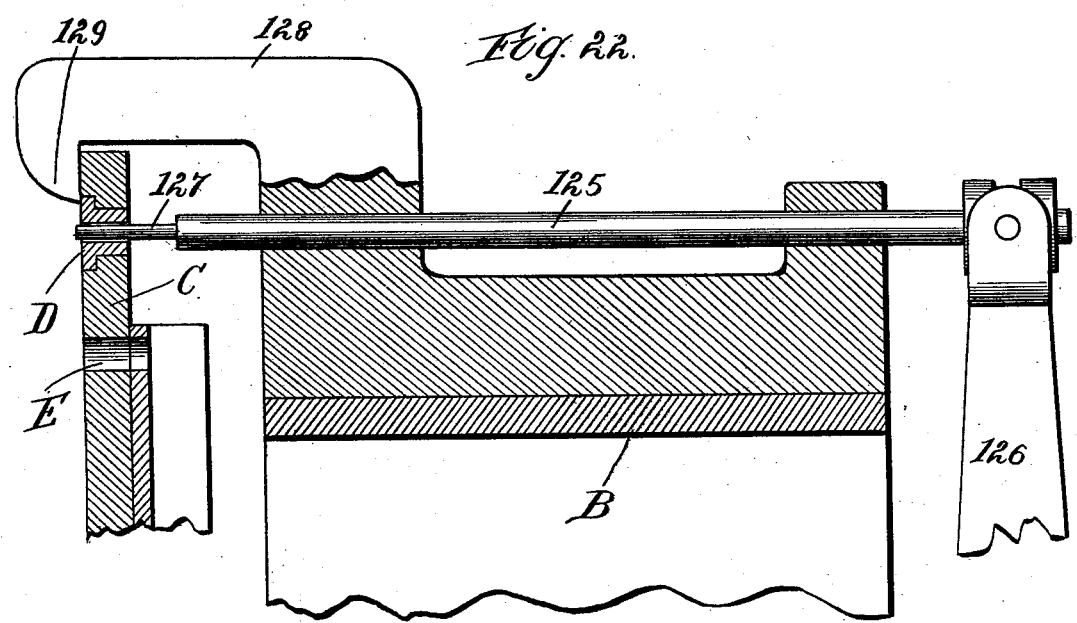
Figure 23:
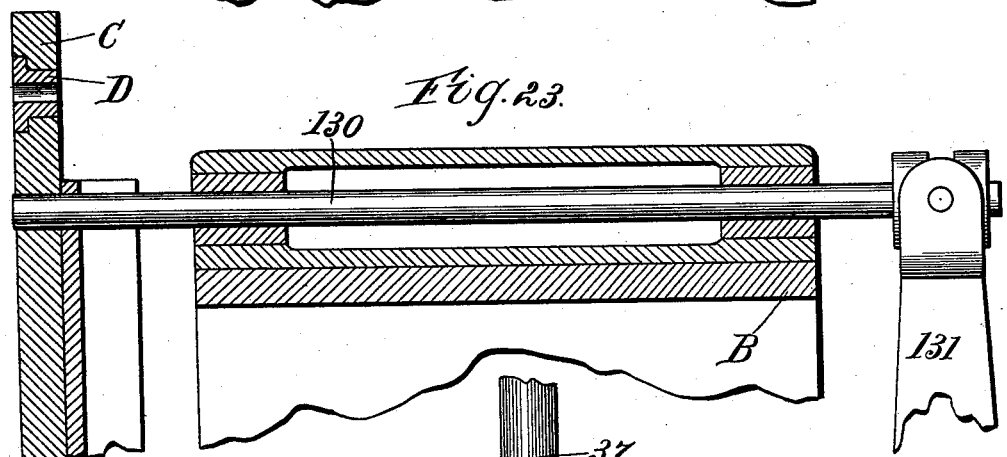
Figure 13:
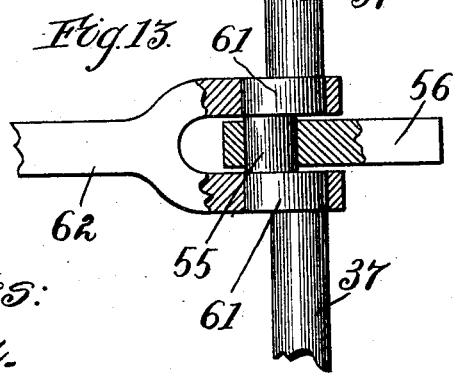

In the accompanying drawings, Figure 1 is a front elevation of a machine embodying our improvement. Fig. 2 is a rear elevation of the same. Fig. 3 is an elevation of the right-hand side. Fig. 4 is a similar view of the left-hand side. Fig. 5 is a plan view of said machine. Fig. 6 shows the feeding and cutting mechanisms. Fig. 7 is a section on line 7 7 of Fig. 6. Fig. 8 is a detail view of the main driving-shaft. Fig. $8^a$ represents in elevation a modification of the mechanism for reciprocating the tools toward and away from the blanks. Fig. $8^b$ is a horizontal section on line $b$ $b$ in Fig. $8^a$. Fig. 9 illustrates the mechanism for revolving the carrying-plate. Fig. 10 shows the mechanism for rocking a cutting device so as to cut off a suitable length of wire to form a blank. Fig. 11 is a central section illustrating the drum or tool-head and the drilling and heading mechanisms. Fig. 12 is an elevation of said heading mechanism. Fig. 13 is a detail view of the shaft for actuating the heading mechanism. Fig. 14 shows the method of mounting the various tools (in the figure the beveling or coning tool) upon the tool-head and the lever for moving the same. Fig. 15 shows the first drill and the result of its operation. Fig. 16 is a similar view showing the operation of the second drill. Fig. 17 shows the result of the operation of the threading device. Fig. 18 is a detached view of said threading-tool. Fig. 19 is an elevation of the slotting and slabbing mechanism. Fig. 20 is a partial plan of the same. Fig. 21 shows the completed nipple. Fig. 22 illustrates the mechanism for extracting said nipple. Fig. 23 shows the gage-pin for holding the carrying-plate securely in position during the performance of said operations.

In our machine the base or frame A serves as a support for the tool-head B and the various operating parts. In front of this drum or tool-head B, on a concentric extension B' thereof, is mounted the carrying-plate C, Figs. 3 and 11, where it is held by the nut C' in such a manner that it is free to rotate. This plate, as aforesaid, is provided with apertures into which the stock-wire may be fed and retained in the form of blanks during the transformation of the same into a nipple. As a preferred construction, however, the plate is not apertured to contain the wire itself, but is constructed to hold a number of dies D, Figs. 11 and 14, of hard material, as steel, in which the wire fits snugly. Consequently the continued wear of the wire on the edges of the aperture or an imperfection either in material or operation causing the nipple to stick in its aperture does not require the removal of the carrying-plate, but only of so many of the dies as have become useless. The wire may be fed to the dies of this plate at any convenient point and the operating mechanisms located to harmonize with the views of the designer. We have found the following arrangement, however, very advantageous and shall describe our machine as so constructed, although the exact relative order of the operating mechanisms is not regarded as an essential feature of the invention.

Referring to Fig. 1, the wire is fed into a die when it reaches the lower left-hand position, (marked 1,) and while in such position the wire is cut, leaving a blank inserted in the die. The plate then moves in the direction indicated by the arrow and is stopped at 2, where the blank is headed. Continuing its motion, it is beveled or coned at 4, drilled at 5, drilled again at 6, threaded at 7, slotted and slabbed at 8, and extracted at 9. At 10 the gage-pin is inserted into one of the apertures E opposite it at that time, whereby the plate is held to secure the more accurate and certain adjustment of the plate during the operation of the tools. It will be noticed that at 3 no function is performed. A place is left here for any additional operation which may hereinafter be considered desirable.

The feeding and cutting mechanisms are shown in Figs. 4 to 7. The wire coming from a reel is straightened horizontally by rollers 12, 13, and 14 and vertically by rollers 15, 16, and 17, mounted on the arm F. A suitable length is then fed into a die by the wheels 18 and 19, which are intermittently driven by the crank 20 and pitman 21. This crank 20 is attached to an auxiliary shaft 37, and the pitman 21 swings arm 22, to which is secured pawl 23, driving ratchet-wheel 24, mounted on the same shaft 25 which carries the wheel 19. Shafts 25 and 26 are geared together by spurs 27 and 28, so that they rotate in unison. By this arrangement a length of wire G, Fig. 6, suitable for a blank is fed into the die by the partial rotation given wheels 18 and 19 by the ratchet-wheel 24 and its pawl 23, held in engagement by the coil-spring 29. It is desirable to have the wheels 18 and 19 adjustable toward and away from each other, so that in case the wire tends to slip between them during their rotation they may be brought nearer together to grip it more tightly. As a preferred construction the shafts 25 and 26 are eccentrically journaled in the boxes 30 and 31, which are free to turn in the pillow-block 32, Figs. 6 and 7, and said boxes are provided with end flanges having peripheral sockets or indentions 34. Hence if wheels 18 and 19 permit the wire to slip between them they may be brought nearer together by lifting the latch-spring 33, so as to disengage its knob 35 from the socket it then occupies, and then turning one or both of said boxes 30 and 31 until slippage is prevented. When a length of the stock-wire has thus been fed into a die, it is necessary to sever the same by a suitable cutting device. For this purpose we employ a saw 36, whose shaft 38, Figs. 4 and 5, is carried by the rocker-arms 39, mounted on the rock-shaft 40. Secured also to this shaft is the dog 41, Fig. 10, which is held in contact with the peripherally indented or recessed cam-wheel 43 by the spring 42. Said wheel 43 is mounted on shaft 45, which is driven from the auxiliary shaft 37 by intervening gears 46, 47, 48, and 49, Fig. 4. Evidently by this arrangement the wheel 43 is continuously rotated from the driving-shaft, and the dog 41 during such rotation is held stationary until the depression 44 is turned into such position that said dog is free to enter it. The spring 42 at this time forces the dog into the depression, so that the rock-shaft 40 is turned sufficiently to throw the saw 36 against the stock-wire, it being understood that said saw 36 is continuously rotated by a driving-belt passing over pulley 50. When stock-wire has been fed into a die and cut off, leaving in said die a blank, the carrying-plate is, as aforesaid, then rotated sufficiently to bring said blank in position to be headed and there left stationary during the performance of such operation. To effectively secure this, various mechanisms may be utilized which will give to the plate the required partial turn and then allow it to remain in its new position a predetermined length of time. As a preferred construction we employ the mechanism shown in detail in Figs. 4 and 9, the latter figure being a rear view of the carrying-plate. Here the rear of the carrying-plate C is shown provided with a series of radial slots or guideways 53, formed by the ribs 52, and a crank 51, whose pin 54 may slide in said slots, is mounted on shaft 45, which, it is understood, is continuously driven from the main shaft 37. It is evident from this arrangement that said crank in revolving enters the slot or guideway 53 and during a portion of its revolution drives the plate in the direction indicated by the arrow until the blanks reach the next operating mechanism. It then becomes disengaged and pursues the remainder of its revolution free from the plate, leaving the latter stationary and free from the jar of moving machinery.

Upon reaching position 2, Fig. 1, the blank is headed by mechanism arranged to upset a portion of its length. In the preferred construction (shown in Figs. 11, 12, and 13) the auxiliary shaft 37 is shown bent, so as to form a crank portion 55, which drives the pitman 56 so as to rock the bell-crank 57. Pivotally secured to the other arm of said bell-crank is the link or coupling 59, by means of which a straight-line motion may be communicated to the stop 60. The latter may thus be set securely against the die of the carrying-plate and its protruding blank, so as to hold the blank rigid while its opposite end is headed. For heading the blank the transversely-bent portions 61 of the shaft 37 are rounded, so as to act as eccentrics to impart a reciprocating motion to the rod or bar 62, which is pivotally secured at its opposite end to the lever 63. This lever 63 is designed to push the punch or header 64 against the blank with such force as to upset a portion thereof, so as to form a head. In practice we find it desirable to make the lever adjustable with reference to the punch or header and for this purpose interpose a screw 65, with its set-nut 66, which allows a nicety of adjustment otherwise difficult to attain, and to employ a spring 67 for withdrawing the punch or header after it has done its work and the lever 63 with its screw 65 has swung back. It is thus apparent that a single revolution of shaft 37 moves the stop for backing the blank prior to swinging the lever 63 to upset a portion of the same. This operation, it is understood, is so timed that it takes place when the plate is stationary—that is, when the crank 51 is revolving independent of said plate.

The blank upon reaching position 4, Fig. 1, is coned or beveled. For this purpose mechanism for shaving off a portion of the tip of the blank may be employed.

In the preferred construction a rotary spindle 68, carrying a pulley 69 and provided with a head 70 for grasping the tool 71, Figs. 3 and 14, is journaled on the drum or tool-head B, so that it may be moved longitudinally by any suitable means—as, for instance, the vibratory lever 72. The tool 71 may be any suitable rotary tool internally reamed to correspond to the desired bevel of the nipple and provided with one or more cutting edges. Said lever 72 is swiveled to the rotary spindle by the projections 73 of the fork 74 engaging with the groove 75 of the adjustable collar 76, with which said spindle is provided, is pivoted to the rear of the drum by the forked bolt 77, and terminates in the groove or channel in the central collar 78, Fig. 11. Said collar 78 is preferably mounted on the projection 79 of the drum, is internally socketed, and is provided with an extension to which may be coupled mechanism for its operation. Motion is communicated to this collar from the main driving-shaft 80, Fig. 8, carrying the spur-wheel 81, by intervening mechanism consisting of gears 82 and 83, Fig. 3, driving the gear 84, having the crank 85. The pitman 86, reciprocated by crank 85, swings the lever 87, coupled to the collar 78 by the link 88. Hence it is evident that the continuous rotation of the power-shaft 80 by pulley 90 alternately moves the coning-tool toward and away from the blank held in the carrying-plate by the reciprocation of the vibratory lever 72 by the collar 78. It is understood that the tool is continuously rotated by belting passing over pulley 69, so that it is necessary only to urge the tool to contact with the blank in order to secure the performance of its operation. Also the coning-tool, as well as the feed mechanism, the cutting mechanism, and the heading mechanism, operated, as explained, from auxiliary shaft 37, driven by main shaft 80, is arranged to perform its operation at a time when the plate is stationary, and, further, that inasmuch as various other tools are caused to operate simultaneously by the actuation of similar vibratory levers by the collar 78 each mechanism is operating while the plate is at rest, but inactive (so far as the blanks are concerned) when it is being turned by the crank 51.

The coning or beveling tool being withdrawn and the carrying-plate turned to bring the blank to position 5, it is drilled to form the larger socket. As shown in Fig. 15, a drill 91, carried by a similar rotary spindle 92, is operated simultaneously with spindle 68 by a like lever 93, similarly engaged with collar 78. At position 5 the blank is bored again, as shown in Fig. 16, by drill 94, similarly operated by lever 96, and at position 7 is threaded, as shown in Fig. 17, by tap 97. Owing, however, to the necessity of withdrawing the tap so that its screw will return in the threads cut by it, it is desirable to provide a reversible spindle and also a more delicate mechanism for engaging and disengaging the blank and tap. For the latter purpose a yielding or cushion connection with the vibratory lever is found very efficient. In the preferred construction (shown in Figs. 3 and 5) it will be seen that the spindle 98 is provided with two beveled friction-wheels 99 and 100, either one of which may be brought in contact with a similar friction-wheel 101 on a shaft driven by pulley 102; also, that the collar 103 is not rigid with said spindle, but is held between the portions of the divided spring 104. In order that the shaft 105 contained by this spring may not have to revolve with the spindle 98, carrying the threading-tool, said spindle is journaled in a movable carriage 106 and the shaft 105 pivotally connected with this carriage, it being observed that said spindle 98 is capable of longitudinal as well as rotary motion in the bearings of carriage 106, such longitudinal motion permitting the engagement of the bevel-wheels 99 and 100 with wheel 101. Obviously when the vibratory lever 99' urges forward the carriage 106 the threading-tool comes in contact with the blank, but does not enter it until the carriage is moved sufficiently to cause the wheel 99 to come in contact with the continuously-rotating wheel 101. The spindle 98 then rotates and the tap cuts a thread in the nipple, the spring connection with the vibratory lever 99 allowing its forward motion to be the same as that which its rotation in a threaded socket would naturally give it. When the blank is thus threaded, the rearward movement of the vibratory lever 99' permits the carriage 106 to recede, so that the bevels 100 and 101 are thrown in contact and the tap rotated in an opposite direction before any rearward motion is imparted to it, and while being withdrawn the tap, by reason of said yielding connection, is able to accommodate itself to the threads cut when entering. The carrying-plate is then turned and leaves the blank at position 8, where it is both slotted for a screwdriver blade and slabbed to afford purchasing-surfaces for a wrench. For this purpose a slotting device may be brought in contact with the blank and slabbing-tools made to plane a portion of the blank. As a preferred construction, Figs. 4, 5, 19, and 20, an arm or bracket 108 is extended from the tool-head, which acts as a support and furnishes a bearing for the bell-crank lever 109. Journaled in the bearing at the end of the short arm of this lever is the shaft 110, carrying the saw 111 and pulley 112. The long arm of the lever is connected by a link or coupling 113 to a carriage 114, which in turn is connected by rod 115 to a similar vibratory lever 116 and is provided at its forward end with shaft 117, carrying pulley 118 and the saws 119, mounted in parallel planes. It is evident from this arrangement that when the carriage 114 occupies the position shown by dotted lines in Fig. 19 the saws are at sufficient distance from the carrying-plate to permit the free rotation of the same with its series of blanks in the dies. When, however, said carriage is urged forward by lever 116, the saws 119 are moved toward the dial-plate, and at the same time the lever 109 is rocked, throwing the swinging saw 111 toward the head of the nipple. Owing to the short distance which said saw 111 has to move, and to the relative arrangement of the parts, it reaches the blank before the saws 119 have reached it from the opposite side, and hence the blank is held against longitudinal movement, which might take place if the slabbing-saws reached it first. The saws 111 and 119, being continuously rotated by belts and pulleys 112 and 118, cut the desired portions from the nipples, the former cutting a channel or slot in the head and the two latter producing two parallel faces at its opposite end. In practice we find it advantageous to provide additional idle-pulleys 120 and 121, Fig. 4, and to arrange a single belt, as shown by the dotted lines, passing it around pulleys 112 and 118 to rotate the saws, then to the under side of 120, so as to obtain ample bearing-surface on said pulley 118, and then to 121, from which it may be led upward to a driving-pulley. The blank is now changed to a complete nipple and is ready to be removed from the carrying-plate preparatory to the insertion of additional wire for the formation of a new blank. For this purpose at position 9 a spindle or extractor 125, Fig. 22, having its forward end turned to fit the die D, is mounted on the tool-head and swiveled to a similar vibratory lever 126. Hence the spindle or extractor is urged forward when a die is left opposite it, so that its reduced end 127 enters the same and drives the nipple therefrom. In order that the die as well may not be dislodged from its seat in the carrying-plate, an arm 128 is extended from the tool-head, and its bent end portion 129 covers a portion of the die, thereby holding it in its place. As aforesaid, it is desirable to have the carrying-plate securely locked during the performance of the above-mentioned operations, so that accidental movement of the same is guarded against, and at the same time the accurate adjustment of the blanks for each operation is assured. For this purpose any locking device may be employed, but as a preferred construction we utilize the simple mechanism shown in Fig. 23. This mechanism consists in the spindle or gage-pin 130, mounted on the tool-head and arranged to be driven into one of the apertures E, with which the plate is provided. This gage-pin is for convenience placed in position 10 and is actuated by a similar vibratory lever 131. However, inasmuch as these apertures E are nearer the center of the plate than the dies the vibratory lever for the gage-pin is shorter than the others, and as the gage-pin is made long enough to extend very close to the plate when withdrawn it will, although actuated by collar 78, which actuates the tools, enter an aperture E before the tools reach their allotted blanks, and will remain in said aperture for a short time after the tools have completed their operations and been withdrawn. An additional turn of the plate brings the empty die again to position 1, where stock for a new blank is inserted and the process continued, as described.

With further reference to the reciprocation of the tools toward and away from the blanks, it is found desirable in many instances to have the tools proceed very gradually at the moment when they come into contact with the blanks, so as to avoid any shock or breakage, and also to have them return, after they have reached the end of their respective strokes, with a quick initial movement, so that the threads just cut in the blanks shall not be reamed out by the continual turning, even for a very short space of time, of the taps before being withdrawn. As a simple and efficient mechanism for doing this, we substitute for the crank 85, Fig. 3, a cam motion which is designed to impart to the pitman 86 a slow initial forward motion and a quick initial return. In Figs. $8^a$ and $8^b$ we have shown the gear-wheel 84 provided with the cam $85^a$, having the requisite curvature to impart the desired motion to the pitman 86 when the wheel $86^a$, with which the pitman is provided, follows the periphery of said cam. In place of using a spring or other well-known contrivance for keeping the cam and wheel together we provide a second cam $85^b$, which is the complement of the cam $85^a$—that is to say, the periphery of cam $85^b$ is so curved that all the lines passing through the center of the shaft 37 and having their ends, respectively, in the peripheries of one or the other of the two cams shall have the same length. By then adding a second wheel $86^b$ to the pitman 86, located so that the distance between it and the wheel $86^a$ is equal to the common length of these lines, the pitman may be reciprocated without the possibility of any lost or irregular motion. The pitman should, however, be maintained in its required relation with the cams, and for this purpose is provided with a slot $86^c$, having the brasses $86^d$, which serves as a guideway for the shaft 37, having the external flange or collar $37^a$. In this way the pitman 86 is held in place while reciprocating backward and forward by reason of the positive cam motion to which it is subjected, and the tools are actuated in the manner desired through the power-transmitting connection hereinbefore described.

What we claim as our invention is—

1. An automatic machine of the class specified comprising a movable carrier adapted to receive and hold a series of blanks; means for imparting thereto an intermittent or step-by-step movement; a number of serially-assembled mechanisms arranged to operate on the blanks as the latter are brought before them; power-transmitting connection for causing the simultaneous operation of said mechanisms; means for feeding a length of wire sufficient for a blank to the carrier during its intervals of rest; and a rotary cutting device connected so as to operate at a time after such length of wire has been fed to the carrier.

2. An automatic machine of the class specified, comprising a movable carrier for holding a series of blanks; means for intermittently driving the same; a number of serially-assembled mechanisms connected with means for causing their simultaneous operations on the blanks; means for feeding a length of wire to the carrier during its intervals of rest; a cutting device mounted on a swinging support; and means for swinging the same to sever the wire after the proper length has been fed to the carrier.

3. An automatic machine of the class specified comprising a movable carrier for a series of blanks; means for intermittently driving the same; a number of serially-assembled mechanisms connected with means for causing their simultaneous operations; a pair of intermittently-rotated wheels by which the stock-wire is fed to the carrier during its intervals of rest; a cutting device mounted on a swinging support; and means for swinging the same to sever the wire after the proper length has been fed to the carrier.

4. An automatic machine of the class specified comprising a movable carrier for the blanks; means for intermittently driving the same; mechanism for upsetting a portion of a blank to form a head thereon; a number of rotary operating-tools for acting on the blanks; a device for feeding a length of stock-wire to the carrier during its intervals of rest; and means for severing the wire after the proper length has been fed to the carrier.

5. An automatic machine of the class specified comprising a movable carrier for the blanks; means for intermittently driving the same; mechanism for upsetting a portion of a blank to form a head thereon; a number of rotary operating-tools for acting on the blanks; a device for feeding a length of stock-wire to the carrier during its intervals of rest; means for severing the wire after the proper length has been fed to the carrier; means for removing the finished product from the carrier; and a device for locking the carrier in position while at rest.

6. An automatic machine of the class specified comprising a rotary carrying-plate for the blanks; a crank for engaging during a portion of its revolution, with said carrying-plate for intermittently driving the same; a number of serially-assembled mechanisms for operating on the blanks; means for feeding a length of stock-wire to the carrying-plate during its intervals of rest; and a device for cutting the wire after the proper length has been fed to said plate.

7. An automatic device of the class specified comprising a rotary carrying-plate for the blanks; a crank for engaging, during a portion of its revolution with the carrying-plate, for intermittently driving the same; mechanism for upsetting a portion of the blank to form a head thereon; a number of rotary tools connected with means for simultaneously operating on the blanks; means for feeding a length of stock-wire to the carrier during its intervals of rest; and a device for cutting the wire after the proper length has been fed to the carrier.

8. An automatic machine of the class specified comprising a rotary carrying-plate; means for intermittently rotating the same; mechanism for upsetting a portion of a blank carried by said plate to form a head thereon; a number of rotary tools connected with means whereby they simultaneously operate on the blanks; means for feeding a length of stock-wire to the carrying-plate during its intervals of rest; a rotary cutting device mounted on a swinging support; and means for swinging the latter after the proper length of wire has been fed to said plate.

9. An automatic machine of the class specified comprising a rotary carrying-plate; means for intermittently rotating the same; mechanism for upsetting a portion of a blank carried by said plate to form a head thereon; a number of rotary tools connected with means whereby they simultaneously operate on the blanks; a pair of intermittently-rotated wheels for feeding a length of stock-wire to the carrying-plate during its intervals of rest; a rotary cutting device mounted on a swinging support; and means for swinging the latter after the proper length of wire has been fed to said plate.

10. An automatic machine of the class specified comprising a movable carrier; means for intermittently driving the same; a number of serially-assembled operating-tools, connected with a corresponding number of vibratory levers; a single reciprocating device engaging said levers and means for reciprocating the same; means for feeding a length of stock-wire to the carrier during its intervals of rest; and a device for cutting the wire after the proper length has been fed to the carrier.

11. An automatic machine of the class specified comprising a movable carrier for a series of blanks; means for intermittently driving the same; mechanism for upsetting a portion of a blank to form a head thereon; a number of rotary operating-tools, connected with a corresponding number of vibratory levers; a single device engaging the vibratory levers for reciprocating the tools toward and away from the blanks in the carrier; means for feeding a length of stock-wire to the carrier during its intervals of rest; and a device for cutting the wire after the proper length has been fed to the carrier.

12. An automatic machine of the class specified, comprising a rotary carrying-plate for the blanks provided with substantially radial slots; a crank arranged to engage, for a portion of its revolution, with the slots of the carrying-plate, for intermittently driving the same; mechanism for upsetting a portion of the blank to form the head thereon; a number of rotary operating-tools, capable of longitudinal movement; a single reciprocating device connected with the rotary tools for reciprocating the same toward and away from the blanks; means for feeding a length of stock-wire to the carrying-plate at intervals of rest; and a device for severing the wire after the proper length has been fed to said plate.

13. An automatic machine of the class specified, comprising a rotary carrying-plate for the blanks, provided with substantially radial slots; a crank arranged to engage, for a portion of its revolution with the slots of the carrying-plate for intermittently turning the same; mechanism for upsetting a portion of a blank to form a head thereon; a number of rotary operating-tools, capable of longitudinal movement; a corresponding number of vibratory levers connected with said tools for reciprocating the same; a single reciprocating device engaging the levers; means for feeding a length of stock-wire to the plate during its intervals of rest; a rotary cutting device mounted on a swinging support; and means for swinging the same after the proper length of wire has been fed to said plate.

14. An automatic machine of the class specified, comprising a rotary carrying-plate provided with a series of dies for holding the blanks, and also with radial slots; a crank arranged to engage for a portion of its revolution with the slots of said plate; mechanism for upsetting a portion of a blank to form a head thereon; a number of rotary operating-tools, capable of longitudinal movement; vibratory levers connected, respectively, to said tools for reciprocating the same; a central grooved collar engaging the ends of the levers for swinging the same; a couple of intermittently-driven wheels for feeding stock-wire to the plate at intervals of rest; a cutting device on a swinging support, for severing the wire after the proper length has been fed to the plate; and a couple of rods or pins, reciprocated by similar vibratory levers, one for extracting the finished product from the dies, and the other for temporarily locking the plate, substantially as described.

15. The combination with a rotary carrying-plate and means for intermittently turning the same, of a couple of peripherally-grooved wheels for feeding stock to the carrier eccentrically journaled in the revoluble bearings and a pawl-and-ratchet mechanism for driving the same when the carrier is at rest, substantially as described.

16. The combination with a movable carrier and means for intermittently driving the same and with mechanism for feeding stock to the carrier, of a rotary cutting device for severing said stock and means for operating the same when the carrier is at rest.

17. The combination with a movable carrier and means for intermittently driving the same and with mechanism for feeding stock to the carrier, of a rotary cutting device for severing said stock mounted on a swinging support and means for operating the support when the carrier is at rest, substantially as described.

18. The combination of a rotary cutting device mounted on a shaft; means for rotating said shaft; rocker-arms wherein the same is journaled; a rock-shaft controlling the rocker-arms; a dog also mounted on a rock-shaft; a cam-wheel mounted on a rotary shaft and provided with a peripheral indentation for operating the dog; means for holding the dog against said cam-wheel; and power-transmitting connection between the cam-wheel and the main driving-shaft, substantially as described.

19. The combination with an intermittently-driven carrier and driving means therefor and with mechanism for feeding stock to the carrier, of a rotary cutting device for severing said stock mounted on a swinging support; and a cam or eccentric controlled by said driving means and controlling, in turn, the swinging support of the cutting device, substantially as described.

20. The combination with a movable carrier and means for driving the same and with mechanism for feeding stock to the carrier, of a cutting device for severing said stock mounted on a swinging support and a cam-wheel having a peripheral irregularity controlled by the driving means and arranged to actuate the swinging support at a time when the carrier is at rest, substantially as described.

21. The combination with a movable carrier and a rotary shaft for driving the same, the said carrier and shaft being provided with means for engaging one another for a portion of the revolution of the shaft and with mechanism for feeding stock to the carrier, of a cutting device for severing said stock carried by a swinging support, and a cam-wheel mounted on the rotary driving-shaft and arranged to operate the cutting device when the carrier is at rest, substantially as described.

22. The combination with an intermittently-driven carrying-plate having substantially radial guideways and a rotary shaft provided with a crank for engaging for a portion of its revolution with the guideways on said plate, and with mechanism for feeding stock to the carrier; of a cutting device for severing said stock mounted on a rock-shaft; and a cam-wheel mounted on the rotary driving-shaft and having a peripheral irregularity arranged to operate the rock-shaft when the carrier is at rest, substantially as described.

23. The combination with a movable carrier and means for intermittently driving the same, of a number of operating-tools; a single device for operating the same; and a number of vibratory levers connected with the tools and also with the single operating device.

24. The combination with a movable carrier and means for intermittently driving the same, of a number of rotary spindles provided with operating-tools, and means for rotating the same; a number of vibratory levers connected respectively with the rotary spindles; a grooved collar engaging the ends of said levers; and means for reciprocating the collar when the carrier is at rest, substantially as described.

25. The combination with a movable carrier and means for intermittently driving the same, of a number of rotary spindles provided with operating-tools, and with means for rotating the same; a number of vibratory levers connected respectively to said rotary spindles; a reciprocating device connected with the levers; a lever connected with the reciprocating device; and means for swinging the lever when the carrier is at rest, substantially as described.

26. The combination with a movable carrier and means for intermittently driving the same and with mechanism for feeding stock to the carrier; of a cutting device for severing said stock carried by a swinging support; and means for operating the swinging support from the driving mechanism.

27. The combination with a movable carrier and means for intermittently driving the same comprising a rotary shaft provided with a crank which engages the carrier during a portion of its revolution; and with mechanism for feeding stock-wire to the carrier; of a rock-shaft provided with a swinging support whereon is mounted a cutting device; and power-transmitting connection between the rotary shaft and the rock-shaft whereby the rotation of the former turns the latter so as to cut the stock-wire when the carrier is at rest.

28. The combination with the carrying-plate provided with dies for a series of blanks; a crank for intermittently turning the same by engaging for a portion of its revolution with the guideways with which said plate is provided; a rotary shaft carrying said crank; a peripherally-indented cam-wheel mounted on said driving-shaft; a rotary cutting device carried by a rock-shaft; a dog also mounted on said shaft and means for pressing the dog against said cam-wheel, substantially as described.

29. The combination with a holder for a blank, of a punch for upsetting a portion of the blank and a stop for holding the same in position, the said punch and stop being on opposite sides of the holder and the punch being operated by a lever, and the stop by a toggle-joint, as set forth.

30. The combination with a holder for a blank, of mechanism for upsetting a portion of the same to form a head, comprising a punch and a stop, the said punch being operated from a rotary shaft by an intervening lever and the stop being operated from the same shaft by means of an intervening toggle-joint, substantially as described.

31. The combination with a holder for a blank, of a punch or header for upsetting a portion of the same; a lever for operating the punch; a shaft provided with an eccentric; a yoke reciprocated by said eccentric and pivotally connected with said lever; a stop for holding the blank in position; and means for moving the stop against the blank before the punch reaches the same, substantially as described.

32. The combination of a device for upsetting a portion of a blank to form a head; a lever for actuating said heading device; a rotary shaft provided with an eccentric and also with a crank; a yoke or rod driven by said eccentric for operating the lever; a stop for holding the blank in position; and power-transmitting connection between the crank and stop for moving the latter against the blank, substantially as described.

33. The combination of a device for upsetting a portion of a blank; a lever for actuating the same; means for adjusting the lever and heading device; a rotary shaft provided with an eccentric and also with a crank; a rod driven by said eccentric for operating the lever; a stop for retaining the blank in position; a pitman driven by said crank; and power-transmitting connection between the pitman and stop, substantially as described.

34. The combination of a punch for upsetting a portion of a blank; a spring for normally holding the punch away from the blank; a lever for actuating the punch; a screw for adjusting the lever and punch; a rotary shaft provided with an eccentric and also with a crank; a rod driven by the eccentric for operating the lever; a stop for retaining in position a blank; a pitman driven by the crank; a bell-crank lever driven by the pitman; and a link or coupling for pivotally securing the stop and bell-crank lever, substantially as described.

35. The combination with a movable carrier and means for intermittently driving the same, of mechanism for upsetting a portion of a blank; a rotary shaft for driving the heading mechanism which is provided with a crank portion whereof the transversely-extending arms are eccentrics, substantially as described.

36. The combination with a carrier and means for intermittently driving the same, and with mechanism for feeding stock-wire to the carrier; of a cutting device for severing the stock-wire mounted on a swinging support; mechanism for upsetting a portion of a blank and power-transmitting connection for operating both the swinging support and the heading mechanism when the carrier is at rest.

37. The combination with a carrier and means for intermittently driving the same, of a cutting device mounted on a swinging support; mechanism for upsetting a portion of the blank; and power-transmitting connection for operating both the swinging support and heading mechanism from the means for driving the carrier during the intervals of rest on the part of the latter.

38. The combination with a movable carrier and means for intermittently driving the same; of a device for cutting wire which is fed to the carrier; mechanism for upsetting a portion of the blanks to form heads thereon; means for operating the heading mechanism; and power-transmitting connection between the means for operating the heading mechanism, the cutting device and the driving means, whereby the heading mechanism and cutting device are operated when the carrier is at rest.

39. The combination with a movable carrier and means for intermittently driving the same; of a device for cutting wire which is fed to the carrier; mechanism for upsetting a portion of the blanks; a rotary shaft controlling the heading mechanism; and power-transmitting connection between the rotary shaft, heading mechanism, cutting device, and driving means whereby the heading mechanism and cutting device are operated when the carrier is at rest.

40. The combination with a movable carrier; of a rotary shaft and mechanism controlled by the same for upsetting a portion of a blank to form a head thereon; a cutting device mounted on a swinging support; a second rotary shaft arranged to drive the carrier, and controlling the swinging support; and power-transmitting connection between the two rotary shafts whereby the heading mechanism and cutting device are operated when the carrier is at rest.

41. The combination with a movable carrier, of mechanism for upsetting a portion of a blank to form a head, and a rotary shaft controlling the same; a second rotary shaft connected with the first-mentioned shaft and arranged to intermittently drive the carrier; a rotary cutting device mounted on a swinging support; and a cam-wheel on the second rotary shaft which controls the swinging support, substantially as described.

42. The combination with a rotary carrying-plate, of heading mechanism comprising a punch and a stop; a rotary shaft, gear connected with the first-mentioned shaft, and provided with a crank for engaging slots with which the plate is provided for intermittently turning the same; a rotary cutting device mounted on a rocker-arm; a rock-shaft controlling the rocker-arm and provided with a dog; and a cam-wheel on the driving-shaft having a peripheral irregularity which actuates the dog and thereby the cutting device, when the carrier is at rest, substantially as described.

43. The combination with a movable carrier and means for intermittently driving the same, of mechanism for upsetting a portion of the blank to form a head thereon, and a rotary shaft for operating the same; a cutting device mounted on a swinging support; mechanism for feeding a continuous length of wire to the carrier; and power-transmitting connection between the shaft driving the heading mechanism, the means for driving the carrier, the swinging support on which is mounted the cutting device and the feeding mechanism, for actuating the said mechanisms when the carrier is at rest.

44. The combination with a movable carrier, of a rotary shaft for driving the same; mechanism for feeding the stock-wire to the carrier; heading mechanism and a rotary shaft controlling the same which also drives the feeding mechanism; a cutting device mounted on a swinging support and controlled by the rotary driving-shaft; and power-transmitting connection between the rotary shafts for operating said mechanisms when the carrier is at rest.

45. The combination with a movable carrier, of a crank for intermittently driving the same which is mounted on a rotary shaft; a rock-shaft provided with a rocker-arm carrying a cutting device; means for turning the rock-shaft from the rotation of the crank-shaft; a rotary shaft for operating a heading device; power-transmitting connection between said crank-shaft and the shaft operating the heading mechanism; mechanism for feeding stock-wire to the carrier; and a crank and pitman for operating the feeding mechanism from the shaft controlling the heading mechanism, substantially as described.

46. The combination with a rotary carrying-plate, a crank for intermittently turning the same by engaging the slots with which the plate is provided, said crank being mounted on a rotary shaft; a rock-shaft provided with a rocker-arm and also with a dog, the said rocker-arm carrying a cutting device; a wheel mounted on the crank-shaft and provided with a peripheral indentation for rocking the rock-shaft by having the dog enter therein; a rotary shaft provided with a crank and with an eccentric for operating a heading device; power-transmitting connection for driving the crank-shaft from the shaft operating the heading mechanism; means for feeding the stock-wire to the carrier; a crank mounted on the shaft operating the heading mechanisms; and a pitman driven by said crank to actuate the feeding mechanism, substantially as described.

47. The combination, with the movable carrier and means for intermittently advancing the same, of a support for the threading-tool mounted both for rotary motion and for bodily reciprocation toward and away from the carrier, and provided with a couple of bevel friction-wheels; a third bevel friction-wheel arranged for engagement by one or the other of the wheels on the rotary support upon the reciprocation of the latter, according as the same is moved toward or away from the carrier; and mechanism for reciprocating said support during the intervals of rest on the part of the carrier, substantially as set forth.

48. The combination, with the movable carrier and mechanism for intermittently driving the same, of a rotary spindle provided with a threading-tool and supported for longitudinal reciprocation; means for rotating the tool in either direction said means being arranged for engagement by the reciprocation of the spindle; a vibratory lever having a cushion connection with the rotary spindle; and means for swinging the lever when the carrier is at rest, substantially as set forth.

49. In an automatic machine of the class specified, mechanism for threading the blank comprising a rotary spindle provided with a threading-tool; means for reversing the direction of rotation of the rotary spindle; a carriage adapted for longitudinal movement on which said rotary spindle is journaled to allow endwise movement; a non-rotary spindle pivotally connected with said carriage; a vibratory lever for reciprocating the carriage; a spring-held device for engaging with the vibratory lever; and means for actuating the lever, substantially as described.

50. In an automatic machine of the class specified, mechanism for threading the blank, comprising a rotary spindle provided with a threading-tool, and carrying a pair of friction-wheels; a movable carriage wherein said rotary spindle is journaled to allow endwise movement; a third friction-wheel also journaled in said carriage and arranged to engage with either of the spindle friction-wheels for reversing the direction of rotation of the spindle; means for reciprocating the carriage toward and away from the blank; and a spring connection for securing said carriage to the reciprocating means in a non-rigid manner, substantially as described.

51. In an automatic machine of the class specified, mechanism for threading the blank, comprising a rotary spindle provided with a threading-tool, and carrying a pair of bevel friction-wheels; a movable carriage wherein said spindle is mounted for both rotary movement and end play; a third bevel friction-wheel also mounted in said carriage and arranged to be engaged by either of the spindle friction-wheels upon end movement of the spindle; means for continuously rotating said third friction-wheel; a vibratory lever for reciprocating the carriage toward and away from the blank; an extension of the carriage pivotally secured thereto, and provided with a grooved collar for engaging the vibratory lever, said collar being held by a divided spring whereby a non-rigid connection is made between the carriage and the vibratory lever, and means for actuating the lever so as to cause the engagement of the threading-tool with the blank, when the same is in position to be operated on, substantially as described.

52. The combination, with the movable carrier, and means for intermittently advancing the same, of a movable carriage supported for reciprocation toward and away from the carrier; a support for an operating-tool mounted on the carriage for bodily longitudinal movement independent thereof; and mechanism for reciprocating the carriage during the intervals of rest on the part of the carrier, said mechanism being connected with the carriage through the medium of a cushion or elastic connection, as set forth.

53. The combination with a movable carrier and means for intermittently driving the same, of a rotary spindle carrying a threading-tool, and provided with a pair of beveled friction-wheels; a movable carriage on which said spindle is journaled for both rotary and longitudinal motion; means for reciprocating the carriage; a third beveled friction-wheel also mounted in the carriage, and arranged to be engaged by either of the spindle friction-wheels; and means for rotating said third friction-wheel, substantially as described.

54. The combination, with the movable carrier, and means for intermittently advancing the same, of a movable carriage supported for reciprocation toward and away from the carrier; a support for an operating-tool mounted on the carriage both for rotary motion, and for bodily longitudinal movement independent of the carriage; and mechanism for reciprocating the carriage during the intervals of rest on the part of the carrier, said mechanism being connected with the carriage through the medium of a cushion or elastic connection, substantially as set forth.

55. The combination with the movable carrier and means for intermittently driving the same; of means for feeding the stock-wire to the carrier; a device for cutting such wire after a length sufficient for a blank has been fed thereto; mechanism for upsetting a portion of the blanks to form heads thereon; and power-transmitting connection between the feeding means, the cutting device, the heading mechanism and the driving means, whereby said feeding means, cutting device and heading mechanism are operated when the carrier is at rest.

56. In an automatic machine of the class specified, a movable carriage on which is mounted the rotary spindle of an operating-tool, and a vibratory lever for reciprocating the same which is connected to said carriage by means of a spring or cushion connection, substantially as described.

57. The combination with an intermittently-driven carrier and driving means, of a bell-crank lever whereof one arm is provided with a slotting device; a movable carriage to which the other end of said lever is coupled; and means for reciprocating the carriage when the carrier is at rest, substantially as described.

58. The combination with an intermittently-driven carrier and driving means, of a bell-crank lever having a slotting device mounted on one arm; a movable carriage pivotally coupled to the other arm of the lever; a vibratory lever pivotally connected to the carriage for reciprocating the same; and means for operating the vibratory lever, substantially as described.

59. The combination with a movable carrier and means for intermittently driving the same of slabbing-tools mounted on a movable support; a vibratory lever connected with same; and means for reciprocating the vibratory lever, when the carrier is at rest, substantially as described.

60. The combination with a holder for a blank, of a slotting device, and a slabbing device, said devices being supported for reciprocatory movement toward and away from the holder; and means for reciprocating said devices at substantially the same time.

61. The combination, with a holder for a blank, of a slotting device and a slabbing device, said devices being situated upon opposite sides of the holder and arranged for reciprocatory movement toward and away from the holder; and means for reciprocating both devices at substantially the same time, as set forth.

62. In an automatic machine of the class specified, mechanism for slotting and slabbing the blank, comprising an arm or lever provided with a slotting device; a movable support carrying the slotting mechanism; and means for causing both the slotting and slabbing mechanism to operate on the blank at substantially the same time.

63. In an automatic machine of the class specified, mechanism for slotting and slabbing the blank, comprising a bell-crank lever whereof one arm is provided with a slotting device; a movable carriage provided with slabbing mechanism and pivotally coupled with the other arm of the bell-crank lever; and means for moving the carriage so as to operate both mechanisms at substantially the same time.

64. The combination with a holder for a series of blanks, of a bell-crank lever whereof one arm carries a slotting device; a movable carriage provided with slabbing mechanism and pivotally coupled with the bell-crank lever; and means for reciprocating the carriage toward and away from the crank, substantially as described.

65. The combination with a holder for a series of blanks, of a bell-crank lever whereof one arm is provided with a slotting device; a movable carriage provided with rotary cutting-tools for slabbing the blank and pivotally coupled with the bell-crank lever; a lever pivotally connected with the carriage; and means for swinging the lever, substantially as described.

66. The combination with a movable carrier having a series of dies for the blanks, and means for intermittently driving the same, of a punch or extractor for removing the finished product from the dies; and an abutment for holding the dies in place when the product is extracted therefrom, said abutment being arranged on the side of the carrier opposite the punch or extractor, substantially as described.

67. The combination with a movable carrier, of means for feeding the stock-wire to the carrier; a device for cutting the wire after the proper length has been fed; mechanism for upsetting a portion of a blank to form a head thereon; a number of rotary operating-tools; and a rotary shaft having power-transmitting connection for intermittently driving the carrier and also for operating the feeding means, the cutting device, the heading mechanism and the rotary tools when the carrier is at rest.

68. The combination with a movable carrier for a series of blanks, of a rotary shaft provided with means for intermittently driving said carrier; a cutting device mounted on a swinging support which is controlled by the driving-shaft; means for feeding wire to the carrier, mechanism for upsetting a portion of a blank to form a head thereon, and a number of rotary operating-tools, arranged to be reciprocated toward and away from the carrier; and a second rotary shaft connected to drive the first-mentioned shaft, to operate the feeding means and the heading mechanism and to reciprocate the rotary tools, substantially as described.

69. The combination with a rotary carrying-plate for a series of blanks, of a rotary shaft provided with a crank arranged to engage for a portion of its revolution with slots in the carrying-plate; a rock-shaft having a rocker-arm on which is mounted a cutting device; a cam-wheel on the rotary shaft controlling the rock-shaft; mechanism for upsetting a portion of a blank to form a head; means for feeding wire to the carrying-plate; a number of reciprocating operating-tools; and a second rotary shaft which drives the first-mentioned shaft by intervening gears, the heading mechanism by intervening links, the feeding means by a crank and pitman, and which reciprocates the operating-tools by a second crank and pitman, substantially as described.

70. The combination, with a movable carrier, and means for intermittently driving the same, of a number of operating-tools mounted for longitudinal movement; the rotary shaft 37, provided with cams $85^a$ and $85^b$; the pitman 86 controlled by said cams; and power-transmitting connection between said pitman and the operating-tools, substantially as described.

71. The combination with the movable carrier and means for intermittently driving the same, of means for feeding stock-wire to the carrier; a device for cutting such wire after a length sufficient for a blank has been fed thereto; mechanism for upsetting a portion of each blank to form a head thereon; means for slotting and slabbing the blank; and power-transmitting connection between the driving means and the feeding means, the cutting device, the heading mechanism, and the slotting and slabbing means, whereby such mechanisms are operated when the carrier is at rest.

72. The combination, with the movable carrier and means for intermittently driving the same, of means for feeding stock-wire to the carrier; a device for cutting such wire into blanks; mechanism for upsetting the blanks to form heads thereon; a number of rotary supports for operating-tools, said supports being mounted for reciprocatory movement toward and away from the carrier; slotting and slabbing mechanism; and power-transmitting connection between the driving means, said mechanism and the rotary supports, whereby the mechanisms are operated and the rotary supports reciprocated, at a time when the carrier is at rest.

73. The combination, with the movable carrier, and means for intermittently driving the same, of mechanism for upsetting a portion of each blank to form a head thereon; a device for slotting the head thus formed; and power-transmitting connection between the driving means, the heading mechanism and the slotting device, whereby the latter are operated at a time when the carrier is at rest.

74. The combination, with the movable carrier, and means for intermittently driving the same, of means for feeding stock-wire to the carrier; a device for cutting such wire into blanks; mechanism for upsetting a portion of the blanks to form heads thereon; a device for slotting the heads thus formed; and power-transmitting connection between the driving means, and the feeding means, the cutting device, the heading mechanism and the slotting device, whereby the latter are operated at a time when the carrier is at rest.

75. The combination, with the movable carrier constructed to hold a series of blanks and means for intermittently driving the same, of mechanism for upsetting a portion of each blank to form a head thereon; a device for slotting the head thus formed, and for slabbing part of the remainder of the blank; and power-transmitting connection between the driving means and the heading mechanism and the slotting and slabbing devices, whereby the latter are operated at a time when the carrier is at rest.

76. The combination, with the movable carrier and means for intermittently driving the same, of means for feeding wire to the carrier; a device for cutting such wire into blanks; mechanism for upsetting a portion of each blank to form a head thereon; a device for slotting the head thus formed, and for slabbing part of the remainder of the blank; and power-transmitting connection between the driving means, and the feeding means, the cutting device, the heading mechanism, and the slotting and slabbing devices, whereby the latter are operated at a time when the carrier is at rest.

77. The combination, with the movable carrier constructed to hold a series of blanks, and means for intermittently driving the same, of a number of supports for operating-tools, said supports being mounted for reciprocation toward and away from the carrier; a device for slabbing a part of the blank; and power-transmitting connection between the driving means, the supports for the operating-tools, and the slabbing device, whereby the supports are reciprocated and the slabbing device operated at a time when the carrier is at rest.

78. The combination, with the movable carrier, and means for intermittently driving the same, of means for feeding wire to the carrier; a device for cutting such wire into blanks; a number of rotary supports for operating-tools, said supports being mounted for reciprocation toward and away from the carrier; a device for slabbing a part of the blanks; and power-transmitting connection between the driving means and the feeding means, the cutting device, the rotary supports, and the slabbing device, whereby the latter are operated at a time when the carrier is at rest.

79. The combination, with a movable carrier constructed to hold a series of blanks, and with means for intermittently advancing the same, of mechanism for upsetting portions of the blanks; a threading-tool arranged for cutting threads in the blanks; and power-transmitting connection between the driving means, the upsetting mechanism and the threading-tool whereby the two latter are operated at a time when the carrier is at rest.

80. The combination, with a movable carrier constructed to hold a series of blanks, and with means for intermittently advancing the same, of means for feeding wire to the carrier; a device for cutting such wire into blanks; mechanism for upsetting portions of the blanks; a threading-tool arranged for cutting threads in the blanks; and power-transmitting connection between the driving means and the feeding means, the cutting device, the upsetting mechanism and the threading-tool for operating the latter at a time when the carrier is at rest.

81. The combination, with a movable carrier constructed to hold a series of blanks, and with means for intermittently advancing the same, of mechanism for upsetting portions of the blanks; drilling and threading tools for operating on the same; and power-transmitting connection between the driving means, the upsetting mechanism, and the drilling and threading tools for operating the latter at a time when the carrier is at rest.

82. The combination, with a movable carrier constructed to hold a series of blanks, and with means for intermittently driving the same, of means for feeding wire to the carrier; a device for cutting such wire into blanks; mechanism for upsetting portions of the blanks; a drill for boring the same; a tap for threading the interior of the bore formed by the drill; and power-transmitting connection between the driving means and said instrumentalities for operating the latter at a time when the carrier is at rest.

83. The combination with the intermittently-advanced carrier and driving means therefor, of mechanism for upsetting portions of the blanks; slotting and threading tools; and power-transmitting connection between the driving means and said instrumentalities for causing the operation of the latter upon the blanks at a time when the carrier is at rest.

84. The combination with the intermittently-advanced carrier, and driving means therefor, of means for feeding wire to the carrier; a device for cutting the same into blanks; mechanism for upsetting end portions of the blanks to form heads thereon; a slotting device arranged to slot such heads; a threading-tool arranged for application to the unthreaded portions of the blanks; and power-transmitting connection between the driving means and said instrumentalities for operating the latter at a time when the carrier is at rest.

85. The combination with the intermittently-advanced carrier and driving means therefor, of mechanism for upsetting end portions of the blanks; devices for slotting, slabbing and threading the blanks; and power-transmitting connection between the driving means, and said instrumentalities for operating the latter at a time when the carrier is at rest.

86. The combination, with the intermittently-advanced carrier and driving means therefor, of means for feeding wire to the carrier; a device for cutting the same into blanks, mechanism for upsetting end portions of the blanks to form heads thereon; a slotting device arranged to slot the heads so formed; slabbing and threading devices; and power-transmitting connection between the driving means and said instrumentalities for operating the latter during the intervals of rest on the part of the carrier.

87. The combination, with the intermittently-advanced carrier and driving means therefor, of means for feeding wire to the carrier; a device for cutting the same into blanks; mechanism for upsetting the end portions of the blanks to form heads thereon; a slotting device arranged to slot the heads so formed; slabbing and drilling devices; a tap arranged to thread the interior of the bore formed by the drill; and power-transmitting connection between the driving means and said instrumentalities for operating the latter during the intervals on the part of the carrier.

88. The combination with the intermittently-advanced carrier, and driving means therefor, of means for feeding wire to the carrier; a device for cutting the same into blanks; a threading-tool for threading the blanks; and power-transmitting connection between the driving means and said instrumentalities for operating the latter during the intervals of rest on the part of the carrier.

89. The combination, with the intermittently-advanced carrier, and driving means therefor, of means for feeding wire to the carrier; a device for cutting the same into blanks; a drilling-tool arranged for reciprocation toward and away from the carriage; and power-transmitting connection between the driving means and said instrumentalities for operating the latter during the intervals of rest on the part of the carrier.

90. The combination, with the intermittently-advanced carrier and driving means therefor, of means for feeding wire to the carrier; a device for cutting the same into blanks; drilling and threading tools arranged for reciprocation toward and away from the carrier; and power-transmitting connection between the driving means and said instrumentalities for operating the latter during the intervals of rest on the part of the carrier.

91. The combination, with the intermittently-advanced carrier, and driving means therefor, of means for feeding wire to the carrier; a device for cutting the same into blanks; a drilling-tool arranged for reciprocation toward and away from the carrier; a tap also arranged for reciprocation toward and away from the carrier, and adapted to thread the bore formed by said drilling-tool; and power-transmitting connection between the driving means and said instrumentalities for operating the latter during the intervals of rest on the part of the carrier, as set forth.

CHARLES TIMM.
LOUIS C. KRUMMEL.

Witnesses for Timm:
JAMES T. QUINN,
ROBERT M. NORTON.

Witnesses for Krummel:
JOHN G. HODGSON,
FRANK RUDOLPHI.